United States Patent
Terakawa et al.

(10) Patent No.: US 11,830,532 B2
(45) Date of Patent: Nov. 28, 2023

(54) MAGNETIC RECORDING MEDIUM INCLUDING MAGNETIC LAYER HAVING MAGNETIC POWDER, MAGNETIC RECORDING/REPRODUCING DEVICE, AND MAGNETIC RECORDING MEDIUM CARTRIDGE

(71) Applicant: Sony Group Corporation, Tokyo (JP)

(72) Inventors: Masaru Terakawa, Tokyo (JP); Minoru Yamaga, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/637,549

(22) PCT Filed: Oct. 31, 2019

(86) PCT No.: PCT/JP2019/042753
§ 371 (c)(1),
(2) Date: Feb. 23, 2022

(87) PCT Pub. No.: WO2021/065019
PCT Pub. Date: Apr. 8, 2021

(65) Prior Publication Data
US 2022/0284924 A1  Sep. 8, 2022

(30) Foreign Application Priority Data
Oct. 1, 2019  (JP) .................... 2019-181511

(51) Int. Cl.
*G11B 5/78* (2006.01)
*G11B 5/008* (2006.01)
(Continued)

(52) U.S. Cl.
CPC ............ *G11B 5/78* (2013.01); *G11B 5/00813* (2013.01); *G11B 5/70* (2013.01); *G11B 5/714* (2013.01);
(Continued)

(58) Field of Classification Search
None
See application file for complete search history.

(56) References Cited

U.S. PATENT DOCUMENTS

| 7,325,763 B1* | 2/2008 | Argumedo et al. .... G11B 15/67 242/346.2 |
| 2005/0057843 A1* | 3/2005 | Egan ...................... G11B 15/43 360/71 |

(Continued)

FOREIGN PATENT DOCUMENTS

| JP | H09-320031 A | 12/1997 |
| JP | 2001067639 A | 3/2001 |

(Continued)

*Primary Examiner* — Craig A. Renner
(74) *Attorney, Agent, or Firm* — K&L Gates LLP

(57) ABSTRACT

Provided is a magnetic recording medium capable of implementing higher-density recording. This magnetic recording medium includes a substrate containing a polyester and a magnetic layer disposed on the substrate, including a plurality of types of magnetic powder. A surface of the magnetic layer has an arithmetic average roughness Ra of 2.5 nm or less. PSD to a spatial wavelength of 5 μm is 2.5 μm or less. The magnetic layer has an average thickness of 90 nm or less. The magnetic powder has an average aspect ratio of 1.0 or more and 3.0 or less. A coercive force in a perpendicular direction is 3000 oersted or less. A ratio of a coercive force in a longitudinal direction to the coercive force in the perpendicular direction is 0.8 or less. A half-value width of an isolated waveform in a reproduced waveform of a data signal is 200 nm or less.

21 Claims, 13 Drawing Sheets

(51) Int. Cl.
*G11B 5/714* (2006.01)
*G11B 5/70* (2006.01)
*G11B 25/06* (2006.01)
*G11B 23/107* (2006.01)
*G11B 15/60* (2006.01)

(52) U.S. Cl.
CPC ............ *G11B 23/107* (2013.01); *G11B 25/06* (2013.01); *G11B 15/60* (2013.01)

(56) References Cited

U.S. PATENT DOCUMENTS

2005/0117246 A1* 6/2005 Sueki et al. ....... G11B 5/00813
                                                                                360/77.12
2018/0061448 A1* 3/2018 Cherubini et al. ..... G11B 15/32

FOREIGN PATENT DOCUMENTS

| JP | 2001067640 A | 3/2001 |
| JP | 2001341265 A | 12/2001 |
| JP | 2007073086 A | 3/2007 |
| JP | 2007294087 A | 11/2007 |
| JP | 2009032385 A | 2/2009 |
| JP | 2014199706 A | 10/2014 |
| JP | 2015130214 A | 7/2015 |

* cited by examiner

FIG. 5
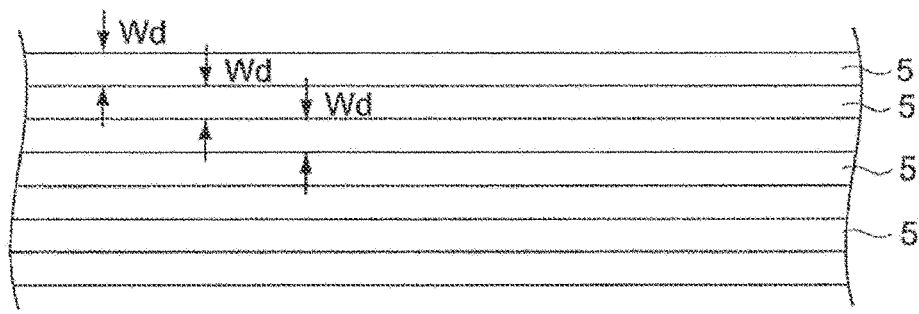
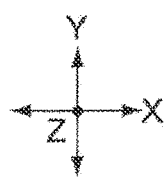
FIG. 6
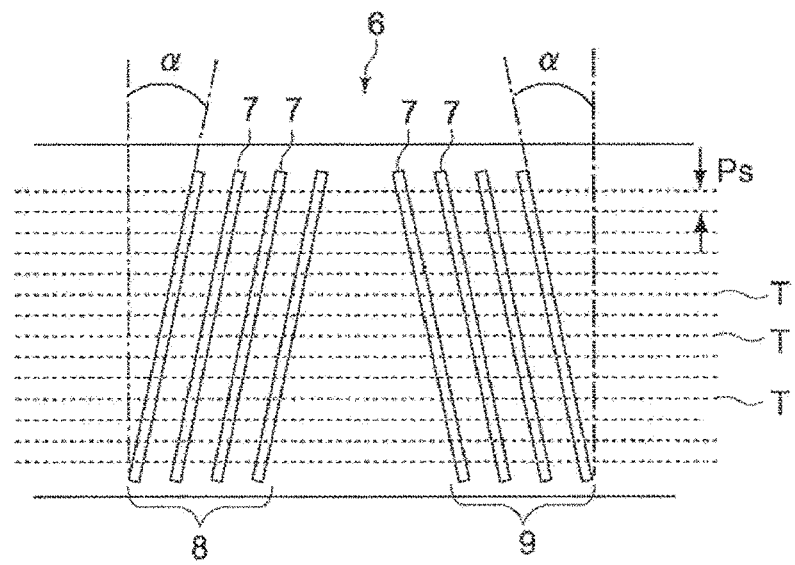
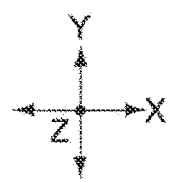

FIG. 17
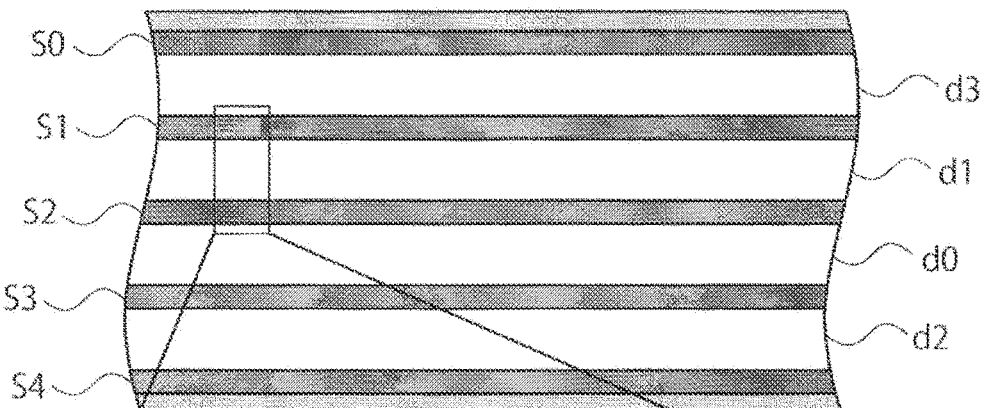
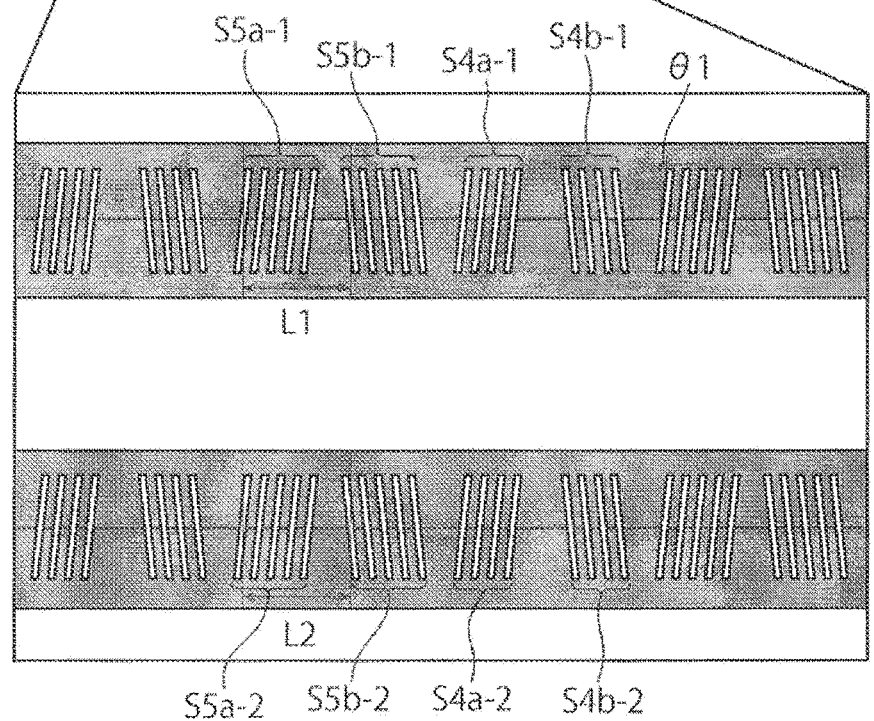

MAGNETIC RECORDING MEDIUM INCLUDING MAGNETIC LAYER HAVING MAGNETIC POWDER, MAGNETIC RECORDING/REPRODUCING DEVICE, AND MAGNETIC RECORDING MEDIUM CARTRIDGE

TECHNICAL FIELD

The present disclosure relates to a magnetic recording medium, and a magnetic recording/reproducing device and a magnetic recording medium cartridge using the magnetic recording medium.

BACKGROUND ART

A tape-shaped magnetic recording medium having a magnetic layer is widely used for storing electronic data. The magnetic layer of the magnetic recording medium includes a data band including a plurality of recording tracks, and data is recorded in the recording tracks. Furthermore, the magnetic layer includes a servo band at a position adjacent to the data band in a width direction, and a servo signal is recorded in this servo band. A magnetic head reads the servo signal recorded in the servo band, and alignment of the magnetic head with respect to the recording tracks is thereby performed.

As a method for recording data in a magnetic recording medium, a horizontal magnetic recording method in which magnetic particles in a magnetic layer are magnetized in a horizontal direction to record data, and a perpendicular magnetic recording method in which magnetic particles in a magnetic layer are magnetized in a perpendicular direction to record data are known. In general, the perpendicular magnetic recording method can record data at a higher density than the horizontal magnetic recording method. The present applicant discloses a technique for obtaining a reproduced waveform of a servo signal having good symmetry in a case where a magnetization direction of a servo signal includes a component in a perpendicular direction (refer to, for example, Patent Document 1).

CITATION LIST

Patent Document

Patent Document 1: Japanese Patent Application Laid-Open No. 2014-199706

SUMMARY OF THE INVENTION

In recent years, with an increase in the amount of data to be recorded, higher-density recording is required. Therefore, a magnetic recording medium capable of implementing higher-density recording is desired.

A magnetic recording medium according to an embodiment of the present disclosure is a tape-shaped magnetic recording medium, and includes a substrate containing a polyester as a main component and a magnetic layer disposed on the substrate, including a plurality of types of magnetic powder, and capable of recording a data signal. Here, arithmetic average roughness Ra of a surface of the magnetic layer is 2.5 nm or less. Power spectrum density (PSD) up to a spatial wavelength of 5 μm is 2.5 μm or less. An average thickness of the magnetic layer is 90 nm or less. An average aspect ratio of the magnetic powder is 1.0 or more and 3.0 or less. A coercive force in a perpendicular direction is 3000 oersted or less. A ratio of a coercive force in a longitudinal direction to the coercive force in the perpendicular direction is 0.8 or less. A half-value width of an isolated waveform in a reproduced waveform of the data signal is 200 nm or less.

A magnetic recording/reproducing device according to an embodiment of the present disclosure includes a feeding unit that can sequentially feed out the above-described magnetic recording medium, a winding unit that can wind up the magnetic recording medium fed out from the feeding unit, and a magnetic head that can write information on the magnetic recording medium and can read out information from the magnetic recording medium while being in contact with the magnetic recording medium traveling from the feeding unit toward the winding unit.

A magnetic recording medium cartridge according to an embodiment of the present disclosure includes the above-described magnetic recording medium and a casing that houses the magnetic recording medium.

The magnetic recording medium, the magnetic recording/reproducing device, and the magnetic recording medium cartridge according to an embodiment of the present disclosure have the above-described configurations, and therefore are advantageous for high-density recording of data.

BRIEF DESCRIPTION OF DRAWINGS

FIG. 5 is a schematic explanatory diagram illustrating the data band illustrated in FIG. 4 in an enlarged manner.

FIG. 6 is a schematic explanatory diagram illustrating a servo signal recording pattern in the servo band illustrated in FIG. 4 in an enlarged manner.

FIG. 17 is a schematic diagram of a data band and a servo band for explaining a method for measuring a deviation amount of a servo track width.

MODE FOR CARRYING OUT THE INVENTION

Hereinafter, an embodiment of the present disclosure will be described in detail with reference to the drawings. Note that the description will be made in the following order.
1. Embodiment
1-1. Configuration of magnetic recording medium
1-2. Method for manufacturing magnetic recording medium
1-3. Configuration of recording/reproducing device
1-4. Effect
2. Modification 1. Embodiment

[1-1 Configuration of Magnetic Recording Medium 10]

Figure 1:
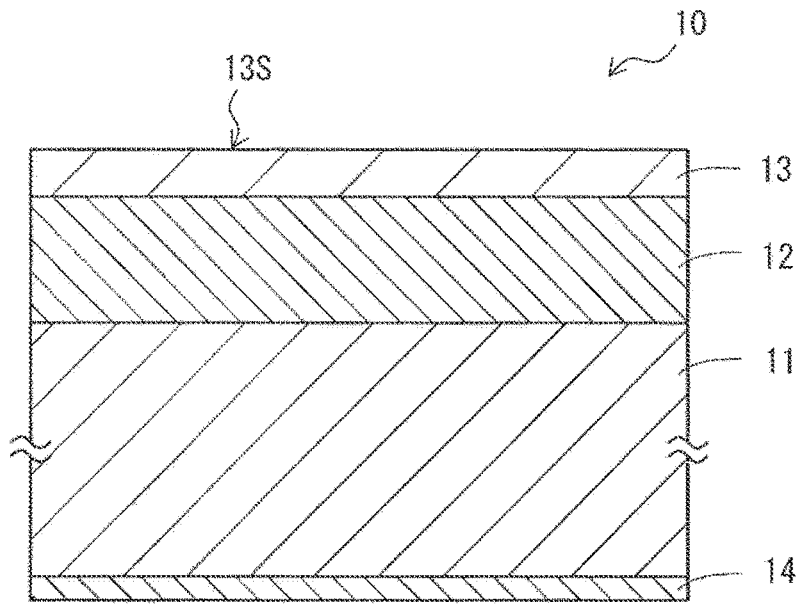
FIG. 1 is a cross-sectional view of a magnetic recording medium according to an embodiment of the present disclosure.

FIG. 1 illustrates a cross-sectional configuration example of a magnetic recording medium 10 according to an embodiment of the present disclosure. As illustrated in FIG. 1, the magnetic recording medium 10 has a laminated structure in which a plurality of layers is laminated. Specifically, the magnetic recording medium 10 includes a long tape-shaped substrate 11, a base layer 12 disposed on one main surface of the substrate 11, a magnetic layer 13 disposed on the base layer 12, and a back layer 14 disposed on the other main surface of the substrate 11. A surface 13S of the magnetic layer 13 is a surface on which a magnetic head travels while being in contact with the surface 13S. Note that the base layer 12 and the back layer 14 are disposed as necessary and may be omitted. Note that the average thickness of the magnetic recording medium 10 is preferably 5.6 μm or less, for example.

The magnetic recording medium 10 has a long tape shape, and travels in its own longitudinal direction during recording and reproducing operations. The magnetic recording medium 10 is preferably used for a recording/reproducing device including a ring type head as a recording head, for example.

(Substrate 11)

The substrate 11 is a nonmagnetic support for supporting the base layer 12 and the magnetic layer 13. The substrate 11 has a long film shape. An upper limit value of the average thickness of the substrate 11 is preferably 4.2 μm or less, and more preferably 4.0 μm or less. When the upper limit value of the average thickness of the substrate 11 is 4.2 μm or less, the recording capacity that can be recorded in one data cartridge can be increased as compared to a general magnetic recording medium. A lower limit value of the average thickness of the substrate 11 is preferably 3 μm or more, and more preferably 3.2 μm or more. When the lower limit value of the average thickness of the substrate 11 is 3 μm or more, a decrease in strength of the substrate 11 can be suppressed.

The average thickness of the substrate 11 is determined as follows. First, the magnetic recording medium 10 having a width of ½ inches is prepared and cut into a length of 250 mm to manufacture a sample. Subsequently, layers of the sample other than the substrate 11, that is, the base layer 12, the magnetic layer 13, and the back layer 14 are removed with a solvent such as methyl ethyl ketone (MEK) or dilute hydrochloric acid. Next, using a laser hologauge (LGH-110C) manufactured by Mitutoyo Corporation as a measuring device, the thickness of the substrate 11 as a sample is measured at five or more points. Thereafter, the measured values are simply averaged (arithmetically averaged) to calculate the average thickness of the substrate 11. Note that the measurement points are randomly selected from the sample.

The substrate 11 includes, for example, a polyester as a main component. The substrate 11 may include at least one of a polyolefin, a cellulose derivative, a vinyl-based resin, and another polymer resin in addition to a polyester. In a case where the substrate 11 includes two or more of the materials described above, the two or more materials may be mixed, copolymerized, or laminated.

The polyester included in the substrate 11 includes, for example, at least one of polyethylene terephthalate (PET), polyethylene naphthalate (PEN), polybutylene terephthalate (PBT), polybutylene naphthalate (PBN), polycyclohexylenedimethylene terephthalate (PCT), polyethylene-p-oxybenzoate (PEB), and polyethylene bisphenoxycarboxylate.

The polyolefin included in the substrate 11 includes, for example, at least one of polyethylene (PE) and polypropylene (PP). The cellulose derivative includes, for example, at least one of cellulose diacetate, cellulose triacetate, cellulose acetate butyrate (CAB), and cellulose acetate propionate (CAP). The vinyl-based resin includes, for example, at least one of polyvinyl chloride (PVC) and polyvinylidene chloride (PVDC).

The other polymer resin included in the substrate 11 includes, for example, at least one of polyamide or nylon (PA), aromatic polyamide or aramid (aromatic PA), polyimide (PI), aromatic polyimide (aromatic PI), polyamide imide (PAI), aromatic polyamide imide (aromatic PAI), polybenzoxazole (PBO) such as ZYLON (registered trademark), polyether, polyether ketone (PEK), polyether ester, polyether sulfone (PES), polyether imide (PEI), polysulfone (PSF), polyphenylene sulfide (PPS), polycarbonate (PC), polyarylate (PAR), and polyurethane (PU).

(Magnetic Layer 13)

The magnetic layer 13 is a recording layer for recording a signal. The magnetic layer 13 includes, for example, magnetic powder, a binder, and a lubricant. The magnetic layer 13 may further include an additive such as conductive particles, an abrasive, or a rust inhibitor as necessary.

The magnetic layer 13 has the surface 13S having a large number of holes. The large number of holes store a lubricant. The large number of holes preferably extend in a perpendicular direction to the surface of the magnetic layer 13. This is because a property of supplying the lubricant to the surface 13S of the magnetic layer 13 can be improved. Note that some of the large number of holes may extend in the perpendicular direction.

The arithmetic average roughness Ra of the surface 13S of the magnetic layer 13 is 2.5 nm or less, preferably 2.2 nm or less, and more preferably 1.9 nm or less. When the arithmetic average roughness Ra is 2.5 nm or less, excellent electromagnetic conversion characteristics can be obtained. A lower limit value of the arithmetic average roughness Ra of the surface 13S of the magnetic layer 13 is preferably 1.0 nm or more, more preferably 1.2 nm or more, and still more preferably 1.4 nm or more. When the lower limit value of the arithmetic average roughness Ra of the surface 13S of the magnetic layer 13 is 1.0 nm or more, a decrease in traveling performance due to an increase in friction can be suppressed.

The arithmetic average roughness Ra of the surface 13S is determined as follows. First, a surface of the magnetic layer 13 is observed with an atomic force microscope (AFM) to obtain an AFM image of 40 µm×40 µm. As the AFM, Nano Scope IIIa D3100 manufactured by Digital Instruments is used. A cantilever including a silicon single crystal is used. Measurement is performed by tuning at 200 Hz to 400 Hz as a tapping frequency. As the cantilever, for example, "SPM probe NCH normal type Point Probe L (cantilever length)=125 µm" manufactured by Nano World can be used. Next, an AFM image is divided into 512×512 (=262,144) measurement points. The height Z(i) (i: measurement point number, i=1 to 262,144) is measured at each measurement point. The measured heights Z(i) at the measurement points are simply averaged (arithmetically averaged) to determine average height (average plane) Zave (=Z(1)+Z(2)+ . . . +Z(262,144))/262,144). Subsequently, a deviation Z"(i) (=|Z(i)−Zave|) from an average center line at each measurement point is determined, and arithmetic average roughness Ra [nm] (=(Z"(1)+Z"(2)+ . . . +Z"(262,144))/262,144) is calculated. In this case, as image processing, data that has been subjected to filtering processing by Flatten order 2 and plane fit order 3 XY is used as data.

Furthermore, in the magnetic layer 13, power spectrum density (PSD) up to a spatial wavelength of 5 µm is desirably 2.5 µm or less. By suppressing the PSD to a certain value or less, spacing between a recording/reproducing head and a tape during recording/reproducing can be reduced, and a medium suitable for high recording density can be obtained. The PSD is measured as follows.

First, a surface of a magnetic tape is observed with an atomic force microscope (AFM) to obtain two-dimensional (2D) surface profile data.

An AFM suitable for measurement is described below.
Dimension 3100 manufactured by Digital Instruments
Cantilever: NCH-10T manufactured by NanoWorld
AFM measurement conditions are described below.
Measurement area: 30 µm×30 µm
Resolution: 512×512
Scan direction of AFM probe: MD direction (longitudinal direction) of magnetic tape
Measurement mode: tapping mode
Scan ratio: 1 Hz Next, the 2D surface profile data obtained by the AFM is subjected to the following filter treatment.
Flatten: 3rd order
Planefit: 3rd order only in MD direction Next, the MD direction of the 2D surface profile data after the filter treatment is subjected to fast Fourier transform (FFT) in each of 512 lines to acquire 512 power spectrum densities (PSDs). Next, the acquired 512 PSDs in the MD direction are averaged for each wavelength to obtain one averaged PSD (hereinafter, referred to as "PSDMD" or "PSD(k)MD") in the MD direction. Note that the following formula (1) is used to average the PSDs in the MD direction.

[Numerical Formula 1]

$$PSD(k)_{MD} = \left( \frac{2d}{N} \left| \sum_{n=0}^{N-1} Z(n) \cdot e^{\left(\frac{2\pi i k n}{N}\right)} \right|^2 \right)_{average} \quad (1)$$

PSD: Power spectrum density ($nm^3$)
z(n): Surface profile data at n-th point (nm)
d: Resolution (nm)=L/N
L: Measurement range (30 µm) in X-axis direction (or Y-axis direction)
N: Number of points in X-axis direction (512 points)
i: Imaginary unit
e: Number of napiers
Average: Averaging operation in Y-axis direction (or X-axis direction)
n: Variable (0 to N−1)
k: Wavenumber (0 to N−1)

Note that the X-axis direction corresponds to the MD direction (longitudinal direction).

Out of PSD values at wavelengths obtained so far, one obtained by integrating PSD values at wavelengths of 5 µm or less is adopted.

An upper limit value of the average thickness of the magnetic layer 13 is preferably 90 nm or less, particularly preferably 80 nm or less, more preferably 70 nm or less, and still more preferably 50 nm or less. When the upper limit value of the average thickness of the magnetic layer 13 is 90 nm or less, in a case where a ring type head is used as a recording head, magnetization can be recorded uniformly in the thickness direction of the magnetic layer 13, and therefore electromagnetic conversion characteristics can be improved. Furthermore, when the upper limit value of the average thickness of the magnetic layer 13 is 90 nm or less, the half-value width of the isolated waveform in the reproduced waveform of the data signal can be narrowed (for example, can be set to 200 nm or less), and a peak of the reproduced waveform of the data signal can be sharpened. Therefore, since reading accuracy of the data signal is improved, the number of recording tracks can be increased and data recording density can be improved.

A lower limit value of the average thickness of the magnetic layer 13 is preferably 35 nm or more. When the upper limit value of the average thickness of the magnetic layer 13 is 35 nm or more, output can be secured in a case where an MR type head is used as a reproducing head, and therefore electromagnetic conversion characteristics can be improved.

The average thickness of the magnetic layer 13 can be determined as follows. First, a carbon film is formed on the surface 13S of the magnetic layer 13 of the magnetic recording medium 10 and on a surface of the back layer 14 thereof by a vapor deposition method. Thereafter, a tungsten thin film is further formed on the carbon film covering the surface 13S of the magnetic layer 13 by a vapor deposition method. The carbon film and tungsten film protect a sample in a thinning process described later.

Next, the magnetic recording medium 10 is processed to be thinned by a focused ion beam (FIB) method and the like. In a case where the FIB method is used, as a pretreatment for observing a TEM image of a cross section described later, a carbon film and a tungsten thin film are formed as protective films. The carbon film is formed on the magnetic layer side surface of the magnetic recording medium 10 and the back layer side surface thereof by a vapor deposition method, and then the tungsten thin film is further formed on the magnetic layer side surface by a vapor deposition method or a sputtering method. The thinning is performed in a length direction (longitudinal direction) of the magnetic recording medium 10. That is, by the thinning, a cross section parallel to both the longitudinal direction of the magnetic recording medium 10 and the thickness direction thereof is formed. The cross section of the obtained thinned sample is observed with a transmission electron microscope (TEM) under the following conditions to obtain a TEM image. Note that the magnification and the acceleration voltage may be appropriately adjusted depending on the type of a device.

Device: TEM (H9000NAR manufactured by Hitachi, Ltd.)
Acceleration voltage: 300 kV
Magnification: 100,000 times Next, using the obtained TEM image, the thickness of the magnetic layer 13 is measured at at least ten or more points in the longitudinal direction of the magnetic recording medium 10. An average value obtained by simply averaging (arithmetically averaging) the obtained measured values is taken as the average thickness of the magnetic layer 13. Note that the positions where the measurement is performed are randomly selected from a test piece.

(Magnetic Powder)

The magnetic powder includes, for example, powder of a nanoparticle including ε iron oxide (hereinafter referred to as "ε iron oxide particle"). The ε iron oxide particle can obtain high coercive force even if the ε iron oxide particle is a fine particle. ε iron oxide contained in the ε iron oxide particles is preferably crystal-oriented preferentially in a thickness direction (perpendicular direction) of the magnetic recording medium 10.

Figure 2:
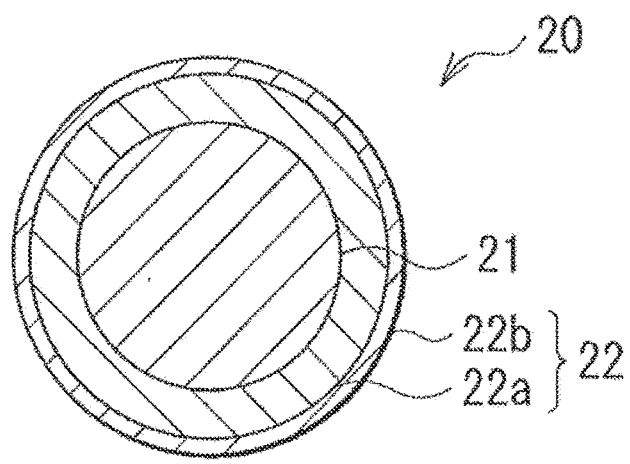
FIG. 2 is a cross-sectional view schematically illustrating a cross-sectional structure of an s-iron oxide particle included in the magnetic layer illustrated in FIG. 1.

FIG. 2 is a cross-sectional view schematically illustrating an example of a cross-sectional structure of an ε iron oxide particle 20 included in the magnetic layer 13. As illustrated in FIG. 2, the ε iron oxide particle 20 has a spherical shape or a substantially spherical shape, or has a cubic shape or a substantially cubic shape. Since the ε iron oxide particle 20 has the shape as described above, in a case where the ε iron oxide particle 20 is used as a magnetic particle, a contact area between the particles in the thickness direction of the magnetic recording medium 10 can be reduced, and aggregation of the particles can be suppressed as compared to a case where a hexagonal plate-shaped barium ferrite particle is used as the magnetic particle. Therefore, dispersibility of the magnetic powder can be enhanced, and a better signal-to-noise ratio (SNR) can be obtained.

The ε iron oxide particle 20 has, for example, a core-shell type structure. Specifically, as illustrated in FIG. 2, the ε iron oxide particle 20 has a core portion 21 and a two-layered shell portion 22 disposed around the core portion 21. The two-layered shell portion 22 includes a first shell portion 22a disposed on the core portion 21 and a second shell portion 22b disposed on the first shell portion 22a.

The core portion 21 in the ε iron oxide particle 20 includes ε iron oxide. ε iron oxide included in the core portion 21 preferably includes an ε-$Fe_2O_3$ crystal as a main phase, and more preferably includes ε-$Fe_2O_3$ as a single phase.

The first shell portion 22a covers at least a part of the periphery of the core portion 21. Specifically, the first shell portion 22a may partially cover the periphery of the core portion 21 or may cover the entire periphery of the core portion 21. The first shell portion 22a preferably covers the entire surface of the core portion 21 from a viewpoint of making exchange coupling between the core portion 21 and the first shell portion 22a sufficient and improving magnetic characteristics.

The first shell portion 22a is a so-called soft magnetic layer, and includes, for example, a soft magnetic material such as α-Fe, a Ni—Fe alloy, or a Fe—Si—Al alloy. α-Fe may be obtained by reducing ε iron oxide included in the core portion 21.

The second shell portion 22b is an oxide film as an antioxidant layer. The second shell portion 22b includes a iron oxide, aluminum oxide, or silicon oxide. α-iron oxide includes, for example, at least one iron oxide of $Fe_3O_4$, $Fe_2O_3$, and FeO. In a case where the first shell portion 22a includes α-Fe (soft magnetic material), α-iron oxide may be obtained by oxidizing α-Fe included in the first shell portion 22a.

By inclusion of the first shell portion 22a in the ε iron oxide particle 20 as described above, a coercive force Hc of the entire ε iron oxide particle (core-shell particle) 20 can be adjusted to a coercive force Hc suitable for recording while a coercive force Hc of the core portion 21 alone is maintained at a large value in order to secure thermal stability. Furthermore, by inclusion of the second shell portion 22b in the ε iron oxide particle 20 as described above, it is possible to suppress deterioration of the characteristics of the s iron oxide particle 20 due to generation of a rust and the like on a surface of the particle by exposure of the ε iron oxide particle 20 to the air during a step of manufacturing the magnetic recording medium 10 and before the step. Therefore, characteristic deterioration of the magnetic recording medium 10 can be suppressed by covering the first shell portion 22a with the second shell portion 22b.

The average particle size (average maximum particle size) of the magnetic powder is preferably 25 nm or less, more preferably 8 nm or more and 22 nm or less, and still more preferably 12 nm or more and 22 nm or less. In the magnetic recording medium 10, a region having a half size of a recording wavelength is an actual magnetization region. Therefore, by setting the average particle size of the magnetic powder to a half or less of the shortest recording wavelength, a good S/N can be obtained. Therefore, when the average particle size of the magnetic powder is 22 nm or less, in the magnetic recording medium 10 having a high recording density (for example, the magnetic recording medium 10 that can record a signal at the shortest recording wavelength of 50 nm or less), good electromagnetic conversion characteristics (for example, SNR) can be obtained. Meanwhile, when the average particle size of the magnetic powder is 8 nm or more, dispersibility of the magnetic powder is further improved, and better electromagnetic conversion characteristics (for example, SNR) can be obtained.

The average aspect ratio of the magnetic powder is preferably 1.0 or more and 3.0 or less, more preferably 1.0 or more and 2.8 or less, and still more preferably 1.0 or more and 2.0 or less. When the average aspect ratio of the magnetic powder is within a range of 1 or more and 3.0 or less, aggregation of the magnetic powder can be suppressed, and resistance applied to the magnetic powder can be suppressed when the magnetic powder is perpendicularly oriented in a step of forming the magnetic layer 13. Therefore, perpendicular orientation of the magnetic powder can be improved.

The average particle size and the average aspect ratio of the magnetic powder described above can be determined as follows. First, the magnetic recording medium 10 to be measured is processed to be thinned by a focused ion beam (FIB) method and the like. Thinning is performed in the length direction (longitudinal direction) of the magnetic tape. That is, this thinning forms a cross section parallel to both the longitudinal direction of the magnetic recording medium 10 and the thickness direction thereof. Cross-sectional observation is performed for the obtained thin sample such that the entire magnetic layer 13 is included with respect to the thickness direction of the magnetic layer 13 using a transmission electron microscope (H-9500 manufactured by Hitachi High-Technologies) with an acceleration voltage of 200 kV and an overall magnification of 500,000 times, and a TEM photograph is imaged. Next, 50 particles are randomly selected from the imaged TEM photograph, and a long axis length DL and a short axis length DS of each of the particles are measured. Here, the long axis length DL means the largest distance among distances between two parallel lines drawn from all angles so as to come into contact with an outline of each of the particles (so-called maximum Feret diameter). Meanwhile, the short axis length DS means the largest length among the lengths of a particle in a direction orthogonal to the long axis length DL of the particle.

Subsequently, the measured long axis lengths DL of the 50 particles are simply averaged (arithmetically averaged) to determine an average long axis length DLave. The average long axis length DLave determined in this manner is taken as an average particle size of the magnetic powder. Furthermore, the measured short axis lengths DS of the 50 particles are simply averaged (arithmetically averaged) to determine an average short axis length DSave. Then, an average aspect ratio (DLave/DSave) of the particle is determined from the average long axis length DLave and the average short axis length DSave.

The average particle volume of the magnetic powder is preferably 2300 $nm^3$ or less, more preferably 2200 nm3 or less, still more preferably 2100 nm3 or less, further still more preferably 1950 $nm^3$ or less, further still more preferably 1600 $nm^3$ or less, and further still more preferably 1300 $nm^3$ or less. When the average particle volume of the magnetic powder is 2300 $nm^3$ or less, the half-value width of the isolated waveform in the reproduced waveform of the data signal can be narrowed (for example, can be set to 200 nm or less), and a peak of the reproduced waveform of the data signal can be sharpened. Therefore, since reading accuracy of the data signal is improved, the number of recording tracks can be increased and data recording density can be improved (details thereof will be described later). Note that the smaller the average particle volume of the magnetic powder, the better. Therefore, a lower limit value of the volume is not particularly limited, but is, for example, 800 $nm^3$ or more.

In a case where the ε iron oxide particle 20 has a spherical shape or a substantially spherical shape, the average particle volume of the magnetic powder is determined as follows. First, an average long axis length DLave is determined in a similar manner to the above-described method for calculating the average particle size of the magnetic powder. Next, an average volume V of the magnetic powder is determined by the following formula.

$$V=(\pi/6)\times(DLave)^3$$

(Binder)

As the binder, a resin having a structure in which a crosslinking reaction is imparted to a polyurethane-based resin, a vinyl chloride-based resin, and the like is preferable. However, the binder is not limited to these resins, and other resins may be blended appropriately according to physical properties and the like required for the magnetic recording medium 10. Usually, a resin to be blended is not particularly limited as long as being generally used in the application type magnetic recording medium 10.

Examples of the resin to be blended include polyvinyl chloride, polyvinyl acetate, a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinyl chloride-vinylidene chloride copolymer, a vinyl chloride-acrylonitrile copolymer, an acrylate-acrylonitrile copolymer, an acrylate-vinylidene chloride copolymer, a methacrylate-vinylidene chloride copolymer, a methacrylate-vinyl chloride copolymer, a methacrylate-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, and nitrocellulose), a styrene-butadiene copolymer, a polyester resin, an amino resin, a synthetic rubber, and the like.

Furthermore, examples of a thermosetting resin or a reactive resin include a phenol resin, an epoxy resin, a urea resin, a melamine resin, an alkyd resin, a silicone resin, a polyamine resin, a urea formaldehyde resin, and the like.

Furthermore, in order to improve dispersibility of the magnetic powder, a polar functional group such as $—SO_3M$, $—OSO_3M$, $—COOM$, or $P=O(OM)_2$ may be introduced into each of the above-described binders. Here, in the chemical formulas described above, M represents a hydrogen atom or an alkali metal such as lithium, potassium, or sodium.

Moreover, examples of the polar functional group include a side chain type group having a terminal group of $—NR1R2$ or $—NR1R2R3^+X^-$, and a main chain type group of $>NR1R2^+X^-$. Here, in the formulas described above, R1, R2, and R3 each represent a hydrogen atom or a hydrocarbon group, and $X^-$ represents an ion of a halogen element such as fluorine, chlorine, bromine, or iodine, or an inorganic or organic ion. Furthermore, examples of the polar functional group include $—OH$, $—SH$, $—CN$, an epoxy group, and the like.

(Lubricant)

The lubricant included in the magnetic layer 13 includes, for example, a fatty acid and a fatty acid ester. The fatty acid included in the lubricant preferably includes, for example, at least one of a compound represented by the following general formula <1> and a compound represented by the general formula <2>. Furthermore, the fatty acid ester included in the lubricant preferably includes at least one of a compound represented by the following general formula <3> and a compound represented by the general formula <4>. By inclusion of two compounds of a compound represented by general formula <1> and a compound represented by general formula <3>, inclusion of two compounds of a compound represented by general formula <2> and a compound represented by general formula <3>, inclusion of two compounds of a compound represented by general formula <1> and a compound represented by general formula <4>, inclusion of two compounds of a compound represented by general formula <2> and a compound represented by general formula <4>, inclusion of three compounds of a compound represented by general formula <1>, a compound represented by general formula <2>, and a compound represented by general formula <3>, inclusion of three compounds of a compound represented by general formula <1>, a compound represented by general formula <2>, and a compound represented by general formula <4>, inclusion of three compounds of a compound represented by general formula <1>, a compound represented by general formula <3>, and a compound represented by general formula <4>, inclusion of three compounds of a compound represented by general formula <2>, a compound represented by general formula <3>, and a compound represented by general formula <4>, or inclusion of four compounds of a compound represented by general formula <1>, a compound represented by general formula <2>, a compound represented by general formula <3>, and a compound represented by general formula <4> in the lubricant, an increase in the coefficient of dynamic friction due to repeated recording or reproduction in the magnetic recording medium 10 can be suppressed. As a result, traveling performance of the magnetic recording medium 10 can be further improved.

$$CH_3(CH_2)_k COOH \qquad <1>$$

(Provided that in general formula <1>, k is an integer selected from a range of 14 or more and 22 or less, more preferably a range of 14 or more and 18 or less.)

$$CH_3(CH_2)_n CH=CH(CH_2)_m COOH \qquad <2>$$

(Provided that in general formula <2>, the sum of n and m is an integer selected from a range of 12 or more and 20 or less, more preferably a range of 14 or more and 18 or less.)

$$CH_3(CH_2)_p COO(CH_2)_q CH_3 \qquad <3>$$

(Provided that in general formula <3>, p is an integer selected from a range of 14 or more and 22 or less, more preferably a range of 14 or more and 18 or less, and q is an integer selected from a range of 2 or more and 5 or less, more preferably a range of 2 or more and 4 or less.)

$$CH_3(CH_2)_p COO-(CH_2)_q CH(CH_3)_2 \qquad <4>$$

(Provided that in the general formula <2>, p is an integer selected from a range of 14 or more and 22 or less, and q is an integer selected from a range of 1 or more and 3 or less.)

(Additive)

As nonmagnetic reinforcing particles, the magnetic layer 13 may further include aluminum oxide (α, β, or γ alumina), chromium oxide, silicon oxide, diamond, garnet, emery, boron nitride, titanium carbide, silicon carbide, titanium carbide, titanium oxide (rutile type or anatase type titanium oxide), and the like.

(Base Layer 12)

The base layer 12 is a nonmagnetic layer including nonmagnetic powder and a binder. The base layer 12 may further include at least one additive selected from a lubricant, conductive particles, a curing agent, a rust inhibitor, and the like as necessary. Furthermore, the base layer 12 may have a multi-layered structure formed by laminating a plurality of layers. The average thickness of the base layer 12 is preferably 0.4 μm or more and 1.4 μm or less, and more preferably 0.6 μm or more and 1.2 μm or less.

Note that the average thickness of the base layer 12 is obtained as follows, for example. First, the magnetic recording medium 10 having a width of ½ inches is prepared and cut into a length of 250 mm to manufacture a sample. Subsequently, in the magnetic recording medium 10 as the sample, the base layer 12 and the magnetic layer 13 are peeled off from the substrate 11. Next, using a laser hologauge (LGH-110C) manufactured by Mitutoyo Corporation as a measuring device, the thickness of a laminate of the base layer 12 and the magnetic layer 13 peeled off from the substrate 11 is measured at five or more points. Thereafter, the measured values are simply averaged (arithmetically averaged) to calculate the average thickness of the laminate of the base layer 12 and the magnetic layer 13. Note that the measurement points are randomly selected from the sample. Finally, the average thickness of the base layer 12 is determined by subtracting the average thickness of the magnetic layer 13 measured using TEM as described above from the average thickness of the laminate.

The base layer 12 may have pores, that is, the base layer 12 may have a large number of pores. The pores of the base layer 12 may be formed, for example, along with formation of pores (holes) in the magnetic layer 13, and in particular, can be formed by pressing a large number of protrusions formed on the surface of the back layer 14 of the magnetic recording medium 10 against the magnetic layer side surface. That is, by forming a recessed portion corresponding to the shape of a protrusion on the surface 13S of the magnetic layer 13, pores can be formed in the magnetic layer 13 and the base layer 12, respectively. Furthermore, pores may be formed as a solvent volatilizes in a step of drying a magnetic layer forming coating material. Furthermore, when the magnetic layer forming coating material is applied to a surface of the base layer 12 in order to form the magnetic layer 13, a solvent in the magnetic layer forming coating material passes through the pores of the base layer 12 formed when the lower layer is applied and dried, and can permeate the base layer 12. Thereafter, when the solvent that has permeated the base layer 12 volatilizes in a step of drying the magnetic layer 13, the solvent that has permeated the base layer 12 moves from the base layer 12 to the surface 13S of the magnetic layer 13, thereby pores may be formed. The pores formed in this way can communicate, for example, the magnetic layer 13 with the base layer 12. The average diameter of the pores can be adjusted by changing the solid content of the magnetic layer forming coating material or the type of a solvent thereof and/or drying conditions of the magnetic layer forming coating material. By forming pores in both the magnetic layer 13 and the base layer 12, a particularly suitable amount of lubricant for good traveling stability appears on the magnetic layer side surface, and an increase in the coefficient of dynamic friction due to repeated recording or reproduction can be further suppressed.

Holes of the base layer 12 are preferably connected to the holes of the magnetic layer 13 from a viewpoint of suppressing a decrease in the coefficient of dynamic friction after repeated recording or reproduction. Here, the state where the holes of the base layer 12 are connected to the holes of the magnetic layer 13 includes a state where some of the large number of holes of the base layer 12 are connected to some of the large number of holes of the magnetic layer 13.

The large number of holes preferably include those extending in a perpendicular direction to the surface 13S of the magnetic layer 13 from a viewpoint of improving a property of supplying the lubricant to the surface 13S of the magnetic layer 13. Furthermore, the holes of the base layer 12 extending in a perpendicular direction to the surface 13S of the magnetic layer 13 are preferably connected to the holes of the magnetic layer 13 extending in a direction perpendicular to the surface 13S of the magnetic layer 13 from a viewpoint of improving a property of supplying the lubricant to the surface 13S of the magnetic layer 13.

(Nonmagnetic Powder of Base Layer 12)

The nonmagnetic powder includes, for example, at least one of inorganic particle powder and organic particle powder. Furthermore, the nonmagnetic powder may include carbon powder such as carbon black. Note that one type of nonmagnetic powder may be used singly, or two or more types of nonmagnetic powder may be used in combination. Examples of the inorganic powder include a metal, a metal oxide, a metal carbonate, a metal sulfate, a metal nitride, a metal carbide, a metal sulfide, and the like. Examples of the shape of the nonmagnetic powder include various shapes such as an acicular shape, a spherical shape, a cubic shape, and a plate shape, but are not limited thereto.

(Binder in Base Layer 12)

The binder in the base layer 12 is similar to that in the magnetic layer 13 described above.

(Back Layer 14)

The back layer 14 includes, for example, a binder and nonmagnetic powder. The back layer 14 may further include at least one additive selected from a lubricant, a curing agent, an antistatic agent, and the like as necessary. The binder and nonmagnetic powder in the back layer 14 are similar to those in the base layer 12 described above.

The nonmagnetic powder in the back layer 14 has an average particle size of preferably 10 nm or more and 150 nm or less, more preferably 15 nm or more and 110 nm or less. The average particle size of the nonmagnetic powder of the back layer 14 is determined in a similar manner to the average particle size of the magnetic powder in the magnetic layer 13 described above. The nonmagnetic powder may include those having a particle size distribution of 2 or more.

An upper limit value of the average thickness of the back layer 14 is preferably 0.6 µm or less, and particularly preferably 0.5 µm or less. When the upper limit value of the average thickness of the back layer 14 is 0.6 µm or less, even in a case where the average thickness of the magnetic recording medium 10 is 5.6 µm or less, the thicknesses of the base layer 12 and the substrate 11 can be kept thick. Therefore, traveling stability of the magnetic recording medium 10 in the recording/reproducing device can be maintained. The lower limit value of the average thickness of the back layer 14 is not particularly limited, but is, for example, 0.2 µm or more, and particularly preferably 0.3 µm or more.

The average thickness of the back layer 14 is determined as follows. First, the magnetic recording medium 10 having a width of ½ inches is prepared and cut into a length of 250 mm to manufacture a sample. Next, the thickness of the magnetic recording medium 10 as a sample is measured at five or more points using a laser hologage (LGH-110C) manufactured by Mitutoyo Corporation as a measuring device, and the measured values are simply averaged (arithmetically averaged) to calculate the average thickness $t_T$ [µm] of the magnetic recording medium 10. Note that the measurement points are randomly selected from the sample. Subsequently, the back layer 14 is removed from the magnetic recording medium 10 as a sample with a solvent such as methyl ethyl ketone (MEK) or dilute hydrochloric acid. Thereafter, using the laser hologauge described above again, the thickness of the sample obtained by removing the back layer 14 from the magnetic recording medium 10 is measured at five or more points, and these measured values are simply averaged (arithmetically averaged) to calculate the average thickness $t_B$ [µm] of the magnetic recording medium 10 from which the back layer 14 has been removed. Note that the measurement points are randomly selected from the sample. Finally, the average thickness $t_b$ [µm] of the back layer 14 is determined by the following formula.

$$t_b \text{ [µm]} = t_T \text{ [µm]} - t_B \text{ [µm]}$$

The back layer 14 has a surface having a large number of protrusions. The large number of protrusions are used for forming a large number of holes on the surface of the magnetic layer 13 in a state where the magnetic recording medium 10 has been wound up in a roll shape. The large number of holes are formed by, for example, a large number of nonmagnetic particles protruding from the surface of the back layer 14.

Here, the case where the large number of holes are formed on the surface of the magnetic layer 13 by transferring the large number of protrusions formed on the surface of the back layer 14 onto the surface of the magnetic layer 13 has been described. However, the method for forming the large number of holes is not limited thereto. For example, the large number of holes may be formed on the surface of the magnetic layer 13 by adjusting the type of a solvent included in the magnetic layer forming coating material, drying conditions of the magnetic layer forming coating material, and the like.

(Average Thickness of Magnetic Recording Medium)

An upper limit value of the average thickness (average total thickness) of the magnetic recording medium 10 is preferably 5.6 µm or less, more preferably 5.0 µm or less, particularly preferably 4.6 µm or less, and still more preferably 4.4 µm or less. When the average thickness of the magnetic recording medium 10 is 5.6 µm or less, the recording capacity that can be recorded in one data cartridge can be increased as compared to a general magnetic recording medium. A lower limit value of the average thickness of the magnetic recording medium 10 is not particularly limited, but is, for example, 3.5 µm or more.

The average thickness tT of the magnetic recording medium 10 is obtained as follows. First, the magnetic recording medium 10 having a width of ½ inches is prepared and cut into a length of 250 mm to manufacture a sample. Next, the thickness of the sample is measured at five or more points using a laser hologage (LGH-110C) manufactured by Mitutoyo Corporation as a measuring device, and the measured values are simply averaged (arithmetically averaged) to calculate the average value tT [µm]. Note that the measurement points are randomly selected from the sample.

(Coercive Force Hc1 in Perpendicular Direction)

An upper limit value of a coercive force Hc1 in a perpendicular direction is 3000 Oe (oersted) or less, more preferably 2900 Oe or less, and still more preferably 2850 Oe or less. The coercive force Hc1 is preferably large because it is less susceptible to thermal disturbance and a demagnetizing field. However, if the coercive force Hc1 exceeds 3000 Oe, saturation recording with a recording head is difficult. This generates a part that cannot be recorded, and increases noise. As a result, electromagnetic conversion characteristics (for example, C/N) may deteriorate.

A lower limit value of the coercive force Hc1 in the perpendicular direction is preferably 2200 Oe or more, more preferably 2400 Oe or more, and still more preferably 2600 Oe or more. When the coercive force Hc1 is 2200 Oe or more, it is possible to suppress a decrease in electromagnetic conversion characteristics (for example, C/N) in a high temperature environment due to thermal disturbance and demagnetizing field.

The above-described coercive force Hc1 is determined as follows. Three magnetic recording media 10 are overlapped and bonded with a double-sided tape, and then punched with a φ6.39 mm punch to manufacture a measurement sample. At this time, marking is performed with an arbitrary ink having no magnetism such that the longitudinal direction (traveling direction) of the magnetic recording medium can be recognized. Then, an M-H loop of the measurement sample (the entire magnetic recording medium 10) corresponding to the longitudinal direction of the magnetic recording medium 10 (traveling direction of the magnetic recording medium 10) is measured using a vibrating sample magnetometer (VSM).

Next, the coating film (the base layer 12, the magnetic layer 13, the back layer 14, and the like) is wiped off using acetone, ethanol, and the like, leaving only the substrate 11. Then, the three substrates 11 thus obtained are overlapped and bonded with a double-sided tape, and then punched with a φ6.39 mm punch to obtain a background correction sample (hereinafter simply referred to as a correction sample). Thereafter, an M-H loop of the correction sample (substrate 11) corresponding to the perpendicular direction of the substrate 11 (thickness direction of the magnetic recording medium 10) is measured using VSM.

In the measurement of the M-H loop of the measurement sample (the entire magnetic recording medium 10) and the M-H loop of the correction sample (substrate 11), for example, a favorably sensitive vibrating sample magnetometer "VSM-P7-15 type" manufactured by Toei Industry Co., Ltd. is used. The measurement conditions are set to measurement mode: full loop, maximum magnetic field: 15 kOe, magnetic field step: 40 bits, time constant of locking amp: 0.3 sec, waiting time: 1 sec, and MH average number: 20.

After the two M-H loops are obtained, the M-H loop of the correction sample (substrate 11) is subtracted from the M-H loop of the measurement sample (the entire magnetic recording medium 10) to perform background correction, and an M-H loop after background correction is obtained. For the calculation of background correction, a measurement/analysis program attached to "VSMP7-15 type" is used.

The coercive force $Hc1$ is determined from the obtained M-H loop after background correction. Note that for this calculation, the measurement/analysis program attached to "VSM-P7-15" is used. Note that each of the above measurements of the M-H loops is performed at 25° C. Furthermore, when the M-H loop is measured in the perpendicular direction of the magnetic recording medium 10, "demagnetizing field correction" is not performed.

(Coercive Force $Hc2$ in Longitudinal Direction)

An upper limit value of a coercive force $Hc2$ of the magnetic recording medium 10 in a longitudinal direction thereof is preferably 2000 Oe or less, more preferably 1900 Oe or less, and still more preferably 1800 Oe or less. When the coercive force $Hc2$ in the longitudinal direction is 2000 Oe or less, magnetization reacts with high sensitivity due to a magnetic field in a perpendicular direction from a recording head. Therefore, a good recording pattern can be formed.

A lower limit value of the coercive force $Hc2$ measured in the longitudinal direction of the magnetic recording medium 10 is preferably 1000 Oe or more. When a lower limit value of the coercive force $Hc$ in the longitudinal direction is 1000 Oe or more, demagnetization due to a leakage magnetic flux from a recording head can be suppressed.

The above-described coercive force $Hc2$ is determined in a similar manner to the coercive force $Hc1$ in the perpendicular direction except that the M-H loops of the entire measurement sample and the background correction sample are measured in a direction corresponding to the longitudinal direction (traveling direction) of the magnetic recording medium 10.

($Hc2/Hc1$)

A ratio $Hc2/Hc1$ representing a ratio of the coercive force $Hc2$ in the longitudinal direction to the coercive force $Hc1$ in the perpendicular direction satisfies $Hc2/Hc1 \leq 0.8$, preferably $Hc2/Hc1 \leq 0.75$, more preferably $Hc2/Hc1 \leq 0.7$, still more preferably $Hc2/Hc1 \leq 0.65$, particularly preferably $Hc2/Hc1 \leq 0.6$. With the coercive forces $Hc1$ and $Hc2$ satisfying $Hc2/Hc1 \leq 0.8$, the degree of perpendicular orientation of the magnetic powder can be increased. Therefore, a magnetization transition width can be reduced, and a high output signal can be obtained at the time of signal reproduction. Therefore, electromagnetic conversion characteristics (for example, C/N) can be improved. Note that as described above, with a small value of $Hc2$, magnetization reacts with high sensitivity due to a magnetic field in a perpendicular direction from a recording head. Therefore, a good recording pattern can be formed.

In a case where the ratio $Hc2/Hc1$ satisfies $Hc2/Hc1 \leq 0.8$, the average thickness of the magnetic layer 13 is particularly effectively 90 nm or less. When the average thickness of the magnetic layer 13 exceeds 90 nm, in a case where a ring type head is used as a recording head, a lower region (region on the base layer 12 side) of the magnetic layer 13 is magnetized in a longitudinal direction thereof, and it may be impossible to magnetize the magnetic layer 13 uniformly in a thickness direction thereof. Therefore, even when the ratio $Hc2/Hc1$ satisfies $Hc2/Hc1 \leq 0.8$ (that is, even when the degree of perpendicular orientation of magnetic powder is increased), it may be impossible to improve electromagnetic conversion characteristics (for example, C/N).

A lower limit value of $Hc2/Hc1$ is not particularly limited, but satisfies, for example, $0.5 \leq Hc2/Hc1$.

Note that $Hc2/Hc1$ represents the degree of perpendicular orientation of magnetic powder. The smaller the value of $Hc2/Hc1$ is, the higher the degree of perpendicular orientation of the magnetic powder is. A reason why $Hc2/Hc1$ is used as an index indicating the degree of perpendicular orientation of the magnetic powder in the present embodiment will be described below.

Conventionally, as an index (parameter) indicating the degree of perpendicular orientation of magnetic powder, a squareness ratio SQ ($=(Mr/Ms) \times 100$, in which Mr (emu): residual magnetization, Ms (emu): saturation magnetization), has been used. However, according to the findings of the present inventors, the index of squareness ratio SQ is not appropriate as an index indicating the degree of perpendicular orientation of magnetic powder for the following reasons.

(1) The squareness ratio SQ fluctuates depending on a value of a coercive force Hc of magnetic powder. For example, as illustrated in FIG. 5, when the coercive force Hc of magnetic powder is large, the squareness ratio SQ is also apparently a large value.

(2) The squareness ratio SQ is affected by a distortion of an M-H loop due to overdispersion.

Therefore, in the present embodiment, $Hc2/Hc1$ is used as an index indicating the degree of orientation of magnetic powder more appropriately. Since the coercive forces $Hc1$ and $Hc2$ simply change depending on an orientation direction of magnetic powder, $Hc2/Hc1$ is more appropriate as an index indicating the degree of orientation of the magnetic powder.

(Squareness Ratio)

The magnetic recording medium 10 has a squareness ratio S1 of, for example, 65% or more, preferably 70% or more, more preferably 75% or more, still more preferably 80% or more, particularly preferably 85% or more in a perpendicular direction (thickness direction) of the magnetic recording medium 10. When the squareness ratio S1 is 65% or more, perpendicular orientation of magnetic powder is sufficiently high. Therefore, better SNR can be obtained.

The squareness ratio S1 is determined as follows. Three magnetic recording media 10 are overlapped and bonded with a double-sided tape, and then punched with a φ6.39 mm punch to manufacture a measurement sample. At this time, marking is performed with an arbitrary ink having no magnetism such that the longitudinal direction (traveling direction) of the magnetic recording medium can be recognized. Then, using a vibrating sample magnetometer (VSM), an M-H loop of the measurement sample (the entire magnetic recording medium 10) corresponding to the longitudinal direction of the magnetic recording medium 10 (traveling direction of the magnetic recording medium 10) is measured. Next, the coating film (the base layer 12, the magnetic layer 13, the back layer 14, and the like) is wiped off using acetone, ethanol, and the like, leaving only the substrate 11. Then, the three substrates 11 thus obtained are overlapped and bonded with a double-sided tape, and then punched with a φ6.39 mm punch to obtain a background correction sample (hereinafter simply referred to as a correction sample). Thereafter, an M-H loop of the correction sample (substrate 11) corresponding to the longitudinal direction of the substrate 11 (traveling direction of the magnetic recording medium 10) is measured using VSM.

In the measurement of the M-H loop of the measurement sample (the entire magnetic recording medium 10) and the M-H loop of the correction sample (substrate 11), for example, a favorably sensitive vibrating sample magnetometer "VSM-P7-15 type" manufactured by Toei Industry Co., Ltd. is used. The measurement conditions are set to measurement mode: full loop, maximum magnetic field: 15 kOe, magnetic field step: 40 bits, time constant of locking amp: 0.3 sec, waiting time: 1 sec, and MH average number: 20.

After the two M-H loops are obtained, the M-H loop of the correction sample (substrate 11) is subtracted from the M-H loop of the measurement sample (the entire magnetic recording medium 10) to perform background correction, and an M-H loop after background correction is obtained. For the calculation of background correction, a measurement/analysis program attached to "VSMP7-15 type" is used.

The squareness ratio S1(%) is calculated by putting saturation magnetization Ms (emu) and residual magnetization Mr (emu) of the obtained M-H loop after background correction into the following formula.

Squareness ratio $S1(\%) = (Mr/Ms) \times 100$

Note that each of the above measurements of the M-H loops is performed at 25° C. Furthermore, when the M-H loop is measured in the perpendicular direction of the magnetic recording medium 10, "demagnetizing field correction" is not performed.

The magnetic recording medium 10 has a squareness ratio S2 of preferably 35% or less, more preferably 30% or less, still more preferably 25% or less, particularly preferably 20% or less, most preferably 15% or less in the longitudinal direction (traveling direction) of the magnetic recording medium 10. When the squareness ratio S2 is 35% or less, perpendicular orientation of magnetic powder is sufficiently high. Therefore, better SNR can be obtained.

The squareness ratio S2 is determined in a similar manner to the squareness ratio S1 except that the M-H loop is measured in the longitudinal direction (traveling direction) of the magnetic recording medium 10 and the substrate 11.

(SFD)

Figure 3:
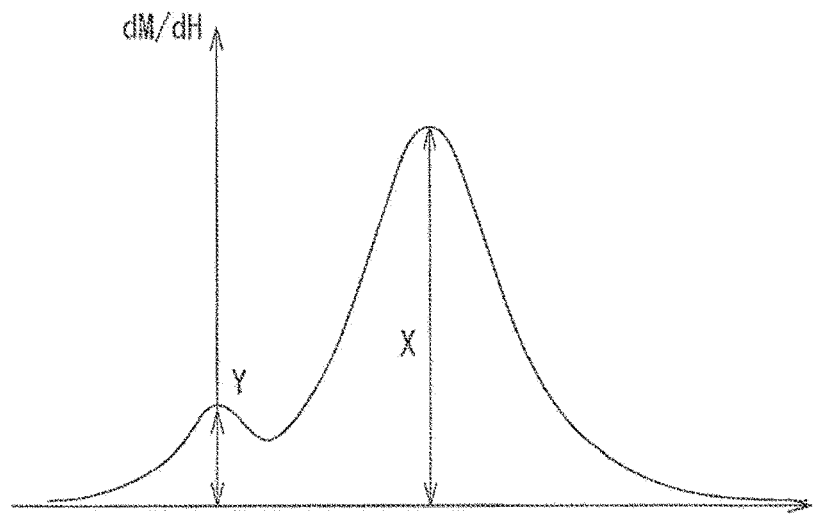
FIG. 3 is a graph illustrating an example of an SFD curve of the magnetic recording medium illustrated in FIG. 1.

In a switching field distribution (SFD) curve of the magnetic recording medium 10, a peak ratio X/Y between a height X of a main peak and a height Y of a sub-peak near the magnetic field zero is preferably 3.0 or more, more preferably 5.0 or more, still more preferably 7.0 or more, particularly preferably 10.0 or more, and most preferably 20.0 or more (refer to FIG. 3). When the peak ratio X/Y is 3.0 or more, it is possible to suppress inclusion of a large amount of low coercive force components unique to ε iron oxide (for example, soft magnetic particles, superparamagnetic particles, or the like) in magnetic powder in addition to the ε iron oxide particle 20 contributing to actual recording. Therefore, it is possible to suppress deterioration of a magnetization signal recorded in an adjacent track due to a leakage magnetic field from a recording head. Therefore, better SNR can be obtained. An upper limit value of the peak ratio X/Y is not particularly limited, but is for example, 100 or less.

The peak ratio X/Y described above is determined as follows. First, in a similar manner to the above method for measuring a coercive force Hc, an M-H loop after background correction is obtained. Next, an SFD curve is calculated from the obtained M-H loop. For calculating the SFD curve, a program attached to a measuring machine may be used, or another program may be used. By taking an absolute value of a point where the calculated SFD curve crosses the Y axis (dM/dH) as "Y" and taking the height of a main peak seen near a coercive force Hc in the M-H loop as "X", the peak ratio X/Y is calculated. Note that the M-H loop is measured at 25° C. in a similar manner to the above method for measuring a coercive force Hc. Furthermore, when the M-H loop is measured in the thickness direction (perpendicular direction) of the magnetic recording medium 10, "demagnetizing field correction" is not performed. Furthermore, according to the sensitivity of VSM used, a plurality of samples to be measured may be stacked on each other to measure the M-H loop.

(Activation Volume Vact)

An activation volume Vact is preferably 8000 nm$^3$ or less, more preferably 6000 nm$^3$ or less, still more preferably 5000 nm$^3$ or less, particularly preferably 4000 nm$^3$ or less, and most preferably 3000 nm$^3$ or less. When the activation volume Vact is 8000 nm$^3$ or less, a dispersed state of magnetic powder is good. Therefore, a bit inversion region can be made steep, and it is possible to suppress deterioration of a magnetization signal recorded in an adjacent track due to a leakage magnetic field from a recording head. Therefore, a better SNR can be obtained.

The activation volume Vact described above is determined by the following formula derived by Street & Woolley.

$Vact~(nm^3) = kB \times T \times Xirr / (\mu 0 \times Ms \times S)$ (In which kB: Boltzmann's constant ($1.38 \times 10^{-23}$ J/K), T: temperature (K), Xirr: irreversible susceptibility, µ0: vacuum permeability, S: magnetic viscosity coefficient, Ms: saturation magnetization (emu/cm$^3$))

The irreversible susceptibility Xirr, the saturation magnetization Ms, and the magnetic viscosity coefficient S to be put in the above formula are determined using VSM as follows. A measurement sample used for VSM is manufactured by punching out a product obtained by overlapping three magnetic recording media 10 with a double-sided tape with a φ6.39 mm punch. At this time, marking is performed with an arbitrary ink having no magnetism such that the longitudinal direction (traveling direction) of the magnetic recording medium 10 can be recognized. Note that a measurement direction using VSM is the thickness direction (perpendicular direction) of the magnetic recording medium 10. Furthermore, the measurement using VSM is performed at 25° C. for a measurement sample cut out from the long magnetic recording medium 10. Furthermore, when the M-H loop is measured in the thickness direction (perpendicular direction) of the magnetic recording medium 10, "demagnetizing field correction" is not performed. Moreover, in the measurement of the M-H loop of the measurement sample (the entire magnetic recording medium 10) and the M-H loop of the correction sample (substrate 11), a highly sensitive vibrating sample magnetometer "VSM-P7-15 type" manufactured by Toei Industry Co., Ltd. is used. The measurement conditions are set to measurement mode: full loop, maximum magnetic field: 15 kOe, magnetic field step: 40 bits, time constant of locking amp: 0.3 sec, waiting time: 1 sec, and MH average number: 20.

(Irreversible Susceptibility Xirr)

The irreversible susceptibility Xirr is defined as an inclination near a residual coercive force Hr in the inclination of a residual magnetization curve (DCD curve). First, a magnetic field of −1193 kA/m (15 kOe) is applied to the entire magnetic recording medium 10, and the magnetic field is returned to zero to obtain a residual magnetization state. Thereafter, a magnetic field of about 15.9 kA/m (200 Ce) is applied in the opposite direction to return the magnetic field to zero again, and a residual magnetization amount is measured. Thereafter, similarly, measurement of applying a magnetic field larger than the previously applied magnetic field by 15.9 kA/m to return the magnetic field to zero is repeated, and a residual magnetization amount is plotted with respect to an applied magnetic field to form a DCD curve. From the obtained DCD curve, a point where the magnetization amount is zero is taken as a residual coercive force Hr, the DCD curve is differentiated, and the inclination of the DCD curve at each magnetic field is determined. In the inclination of this DCD curve, an inclination near the residual coercive force Hr is Xirr.

(Saturation Magnetization Ms)

First, in a similar manner to the above method for measuring a coercive force Hc, an M-H loop after background correction is obtained. Next, Ms (emu/cm$^3$) is calculated from a value of saturation magnetization Ms (emu) of the obtained M-H loop and the volume (cm$^3$) of the magnetic layer 13 in the measurement sample. Note that the volume of the magnetic layer 13 is determined by multiplying the area of the measurement sample by an average thickness of the magnetic layer 13. The method for calculating the average thickness of the magnetic layer 13 necessary for calculating the volume of the magnetic layer 13 is as described above.

(Magnetic Viscosity Coefficient S) First, a magnetic field of −1193 kA/m (15 kOe) is applied to the entire magnetic recording medium 10 (measurement sample), and the magnetic field is returned to zero to obtain a residual magnetization state. Thereafter, a magnetic field equivalent to the value of the residual coercive force Hr obtained from the DCD curve is applied in the opposite direction. A magnetization amount is continuously measured at constant time intervals for 1000 seconds in a state where a magnetic field is applied. A magnetic viscosity coefficient S is calculated by comparing a relationship between time t and a magnetization amount M(t), obtained in this way, with the following formula.

$$M(t) = M0 + S \times \ln(t)$$

(In which M(t): magnetization amount at time t, M0: initial magnetization amount, S: magnetic viscosity coefficient, ln(t): natural logarithm of time)

(Data Band and Servo Band)

Figure 4:
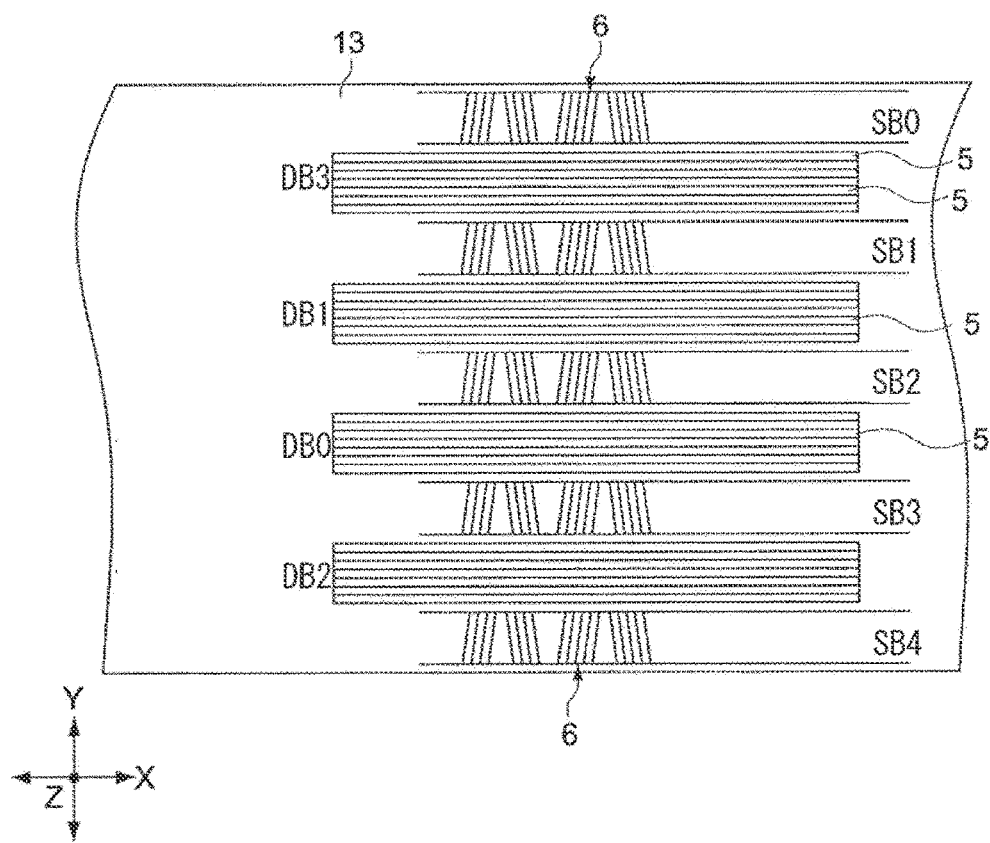
FIG. 4 is a schematic explanatory diagram illustrating a layout of a data band and a servo band in the magnetic recording medium illustrated in FIG. 1.

FIG. 4 is a schematic diagram of the magnetic recording medium 10 as viewed from above. As illustrated in FIG. 4, the magnetic layer 13 includes a plurality of data bands DB (data bands DB0 to DB3 are illustrated in FIG. 4) extending in the longitudinal direction of the magnetic recording medium 10 (X-axis direction), and a plurality of servo bands SB (servo bands SB0 to SB4 are illustrated in FIG. 4) extending in the longitudinal direction of the magnetic recording medium 10 (X-axis direction). A data signal is written in each of the plurality of data bands DB, and a servo signal for controlling tracking of a magnetic head is written in each of the plurality of servo bands SB. Furthermore, each of the data bands DB is disposed so as to be sandwiched by the plurality of servo bands SB adjacent in a width direction (Y-axis direction).

An upper limit value of a ratio $R_S$ ($=(S_{SB}/S) \times 100$) of a total area $S_{SB}$ of the servo bands S with respect to an area S of the surface 13S of the magnetic layer 13 is preferably 4.0% or less, more preferably 3.0% or less, and still more preferably 2.0% or less from a viewpoint of securing a high recording capacity. Meanwhile, a lower limit value of the ratio $R_S$ of the total area $S_{SB}$ of the servo bands SB with respect to the area S of the surface of the magnetic layer 13 is preferably 0.8% or more from a viewpoint of securing five or more servo tracks.

The ratio $R_S$ of the total area $S_{SB}$ of the servo bands SB with respect to the area S of the surface 13S of the magnetic layer 13 can be measured, for example, by developing the magnetic recording medium 10 using a ferricolloid developer (Sigmarker Q manufactured by Sigma Hi-Chemical Inc.) and then observing the developed magnetic recording medium 10 with an optical microscope. The servo bandwidth $W_{SB}$ and the number of servo bands SB are measured from the observation image of the optical microscope. Next, the ratio $R_S$ is determined from the following formula.

Ratio $R_S$ [%] = (((servo bandwidth $W_{SB}$) × (number of servo bands))/(width of magnetic recording medium 10)) × 100

The number of servo bands SB is preferably 5 or more, and more preferably 5+4n (in which n is a positive integer) or more. When the number of servo bands SB is 5 or more, an influence on a servo signal due to a dimensional change of the magnetic recording medium 10 in a width direction thereof can be suppressed, and stable recording/reproducing characteristics with less off-track can be secured.

An upper limit value of the servo bandwidth $W_{SB}$ is preferably 95 μm or less, more preferably 60 μm or less, and still more preferably 30 μm or less from a viewpoint of securing a high recording capacity. A lower limit value of the servo bandwidth $W_{SB}$ is preferably 10 μm or more from a viewpoint of manufacturing a recording head. The width of the servo bandwidth $W_{SB}$ can be determined as follows. First, the magnetic recording medium 10 is developed using a ferricolloid developer (Sigmarker Q manufactured by Sigma Hi-Chemical Inc.). Next, the developed magnetic recording medium 10 is observed with an optical microscope, and the width of the servo bandwidth $W_{SB}$ can be thereby measured.

As illustrated in FIG. 4, the data band DB can form a plurality of recording tracks 5 extending in the X-axis direction and arrayed so as to be adjacent to each other in the Y-axis direction. The data signal is recorded in the recording track 5 along the recording track 5. Note that in the present technology, a 1-bit length (distance between magnetization reversals) of the data signal recorded in the data band DB in the longitudinal direction is typically 48 nm or less. The servo band SB includes a servo signal recording pattern 6 of a predetermined pattern in which a servo signal is recorded by a servo signal recording device (not illustrated).

FIG. 5 is an enlarged diagram illustrating the recording track 5 in the data band DB. As illustrated in FIG. 5, each recording track 5 has a predetermined recording track width Wd in the Y-axis direction. The recording track width Wd is typically 3.0 μm or less. Note that such a recording track width Wd can be measured, for example, by developing the magnetic recording medium 10 with a developing solution such as a ferricolloid developer and then observing the developed magnetic recording medium 10 with an optical microscope.

The number of recording tracks 5 included in one data band DB is, for example, about 1000 to 2000.

FIG. 6 is an enlarged diagram illustrating the servo signal recording pattern 6 in the servo band SB. As illustrated in FIG. 6, the servo signal recording pattern 6 includes a plurality of stripes 7 inclined with a predetermined azimuth angle α with respect to the width direction (Y-axis direction). The plurality of stripes 7 is classified into a first stripe group 8 inclined clockwise with respect to the width direction (Y-axis direction) and a second stripe group 9 inclined counterclockwise with respect to the width direction. Note that the shape or the like of such a stripe 7 can be measured, for example, by developing the magnetic recording medium 10 with a developing solution such as a ferricolloid developer and then observing the developed magnetic recording medium 10 with an optical microscope.

In FIG. 6, a servo trace line T, which is a line to be traced by a servo lead head on the servo signal recording pattern 6, is illustrated by a broken line. The servo trace line T is set in the longitudinal direction (X-axis direction), and is set with a predetermined interval Ps in the width direction.

The number of servo trace lines T per servo band SB is, for example, about 30 to 60.

The interval Ps between two adjacent servo trace lines T is the same as a value of the recording track width Wd, and is, for example, 2.0 μm or less. Here, the interval Ps between two adjacent servo trace lines T is a value that determines the recording track width Wd. That is, when the interval Ps between the servo trace lines T is narrowed, the recording track width Wd is reduced, and the number of recording tracks 5 included in one data band DB increases. As a result, data recording capacity increases (or vice versa in a case where the interval Ps is widened). Therefore, it is necessary to reduce the recording track width Wd in order to increase the recording capacity, but as a result of narrowing the interval Ps between the servo trace lines T, it is difficult to accurately trace the adjacent servo trace lines. Therefore, in the present embodiment, as described later, by narrowing a reproduction signal width, that is, a half-value width of an isolated waveform in a reproduced waveform of a data signal, it is possible to cope with narrowing of the recording track width Wd.

A half-value width PW50 of an isolated waveform in a reproduced waveform of a data signal recorded in the recording track 5 of the magnetic recording medium 10 is, for example, 200 nm or less, preferably 175 nm or less, more preferably 170 nm or less, and still more preferably 165 nm or less.

Note that the half-value width PW50 of the isolated waveform can be determined, for example, as follows. First, using a digital storage oscilloscope, averaging of a plurality of isolated waveforms (synchronous addition averaging) is performed, for example, under conditions of sampling: 500 Ms/s (2 nsec/point) and sampling number: 50,000 points. Then, a half-value width of an isolated waveform is calculated from the obtained isolated reproduced waveform. Note that in the synchronous addition, alignment is performed at a peak position in a waveform.

Furthermore, as a servo lead head for reading a servo signal, a tunnel magneto resistive (TMR) head including a TMR element is used. A reproduction track width (Y-axis direction: width direction of the magnetic recording medium 10) of a servo signal in this TMR head is 48 nm. Furthermore, a spacing between two shields in the TMR head used here (X-axis direction: conveyance direction of the magnetic recording medium 10) is 40 nm, and a bias current in the TMR head is less than 2 mA. Furthermore, a conveyance speed of the magnetic recording medium 10 is 2 m/s.

[1-2 Method for Manufacturing Magnetic Recording Medium 10]

Next, a method for manufacturing the magnetic recording medium 10 having the above-described configuration will be described. First, by kneading and dispersing nonmagnetic powder, a binder, a lubricant, and the like in a solvent, a base layer forming coating material is prepared. Next, by kneading and dispersing magnetic powder, a binder, a lubricant, and the like in a solvent, a magnetic layer forming coating material is prepared. Next, by kneading and dispersing a binder, nonmagnetic powder, and the like in a solvent, a back layer forming coating material is prepared. For preparing the magnetic layer forming coating material, the base layer forming coating material, and the back layer forming coating material, for example, the following solvents, dispersing devices, and kneading devices can be used.

Examples of the solvent used for preparing the above-described coating material include a ketone-based solvent such as acetone, methyl ethyl ketone, methyl isobutyl ketone, or cyclohexanone, an alcohol-based solvent such as methanol, ethanol, or propanol, an ester-based solvent such as methyl acetate, ethyl acetate, butyl acetate, propyl acetate, ethyl lactate, or ethylene glycol acetate, an ether-based solvent such as diethylene glycol dimethyl ether, 2-ethoxyethanol, tetrahydrofuran, or dioxane, an aromatic hydrocarbon-based solvent such as benzene, toluene, or xylene, a halogenated hydrocarbon-based solvent such as methylene chloride, ethylene chloride, carbon tetrachloride, chloroform, or chlorobenzene, and the like. These solvents may be used singly, or may be used in a mixture thereof appropriately.

Examples of a kneading device used for preparing the above-described coating material include a continuous twin-screw kneading machine, a continuous twin-screw kneading machine capable of performing dilution in multiple stages, a kneader, a pressure kneader, a roll kneader, and the like, but are not particularly limited to these devices. Furthermore, examples of a dispersing device used for preparing the above-described coating material include a roll mill, a ball mill, a horizontal sand mill, a vertical sand mill, a spike mill, a pin mill, a tower mill, a pearl mill (for example, "DCP mill" manufactured by Eirich Co., Ltd. and the like), a homogenizer, an ultrasonic wave dispersing machine, and the like, but are not particularly limited to these devices.

Next, the base layer forming coating material is applied to one main surface of the substrate 11 and dried to form the base layer 12. Subsequently, by applying the magnetic layer forming coating material onto the base layer 12 and drying the magnetic layer forming coating material, the magnetic layer 13 is formed on the base layer 12. Note that during drying, magnetic powder is preferably subjected to magnetic field orientation in the thickness direction of the substrate 11 by, for example, a solenoid coil. Furthermore, during drying, the magnetic powder may be subjected to magnetic field orientation in a traveling direction (longitudinal direction) of the substrate 11 by, for example, a solenoid coil, and then may be subjected to magnetic field orientation in a thickness direction of the substrate 11. By performing such a magnetic field orientation treatment, the degree of perpendicular orientation (that is, squareness ratio S1) of the magnetic powder can be improved. After the magnetic layer 13 is formed, the back layer forming coating material is applied to the other main surface of the substrate 11 and dried to form the back layer 14. Therefore, the magnetic recording medium 10 is obtained.

The squareness ratios S1 and S2 and the ratio Hc2/Hc1 are set to desired values, for example, by adjusting the intensity of a magnetic field applied to a coating film of the magnetic layer forming coating material, the concentration of a solid content in the magnetic layer forming coating material, and drying conditions (drying temperature and drying time) of the coating film of the magnetic layer forming coating material. The intensity of a magnetic field applied to a coating film is preferably at least twice the coercive force of the magnetic powder. In order to further increase the squareness ratio S1 (that is, to further reduce the squareness ratio S2), it is preferable to improve the dispersion state of the magnetic powder in the magnetic layer forming coating material. Furthermore, in order to further increase the squareness ratio S1, it is also effective to magnetize the magnetic powder before the magnetic layer forming coating material is put into an orientation device for magnetic field orientation of the magnetic powder. Note that the above methods for adjusting the squareness ratios S1 and S2 may be used singly or in combination of two or more thereof.

Thereafter, the obtained magnetic recording medium 10 is calendered to smooth the surface 13S of the magnetic layer 13. Next, the magnetic recording medium 10 that has been calendered is wound into a roll shape. Thereafter, the magnetic recording medium 10 is heated in this state, and the large number of protrusions on the surface of the back layer 14 are thereby transferred onto the surface 13S of the magnetic layer 13. Therefore, the large number of holes are formed on the surface 13S of the magnetic layer 13.

The temperature of the heat treatment is preferably 50° C. or higher and 80° C. or lower. When the temperature of the heat treatment is 50° C. or higher, good transferability can be obtained. Meanwhile, when the temperature of the heat treatment is 80° C. or lower, the amount of pores may be excessively increased, and the lubricant on the surface 13S of the magnetic layer 13 may be excessive. Here, the temperature of the heat treatment is the temperature of an atmosphere holding the magnetic recording medium 10.

Time for the heat treatment is preferably 15 hours or more and 40 hours or less. When the time for heat treatment is 15 hours or more, good transferability can be obtained. Meanwhile, when the time for heat treatment is 40 hours or less, a decrease in productivity can be suppressed.

Furthermore, a range of pressure applied to the magnetic recording medium 10 during the heat treatment is preferably 150 kg/cm or more and 400 kg/cm or less.

Finally, the magnetic recording medium 10 is cut into a predetermined width (for example, a width of ½ inches). As a result, the target magnetic recording medium 10 is obtained.

[1-3. Configuration of Recording/Reproducing Device 30]

Next, the configuration of the recording/reproducing device 30 for recording information on the magnetic recording medium 10 described above and reproducing information from the magnetic recording medium 10 described above will be described with reference to FIG. 7.

The recording/reproducing device 30 can adjust a tension applied to the magnetic recording medium 10 in a longitudinal direction thereof. Furthermore, the recording/reproducing device 30 can load the magnetic recording medium cartridge 10A thereon. Here, for ease of explanation, a case where the recording/reproducing device 30 can load one magnetic recording medium cartridge 10A thereon will be described. However, in the present disclosure, the recording/reproducing device 30 can load a plurality of magnetic recording medium cartridges 10A thereon. As described above, the magnetic recording medium 10 has a tape shape, and may be, for example, a long magnetic recording tape. The magnetic recording medium 10 may be housed in a casing in a state of being wound around a reel inside the magnetic recording medium cartridge 10A, for example. The magnetic recording medium 10 travels in the longitudinal direction during recording and reproduction. Furthermore, the magnetic recording medium 10 can record a signal at the shortest recording wavelength of preferably 100 nm or less, more preferably 75 nm or less, still more preferably 60 nm or less, particularly preferably 50 nm or less, and can be used, for example, for the recording/reproducing device 30 having the shortest recording wavelength within the above range. The recording track width can be, for example, 2 μm or less.

The recording/reproducing device 30 is connected to information processing devices such as a server 41 and a personal computer (hereinafter referred to as "PC") 42, for example, through a network 43, and data supplied from these information processing devices can be recorded in the magnetic recording medium cartridge 10A.

Figure 7:
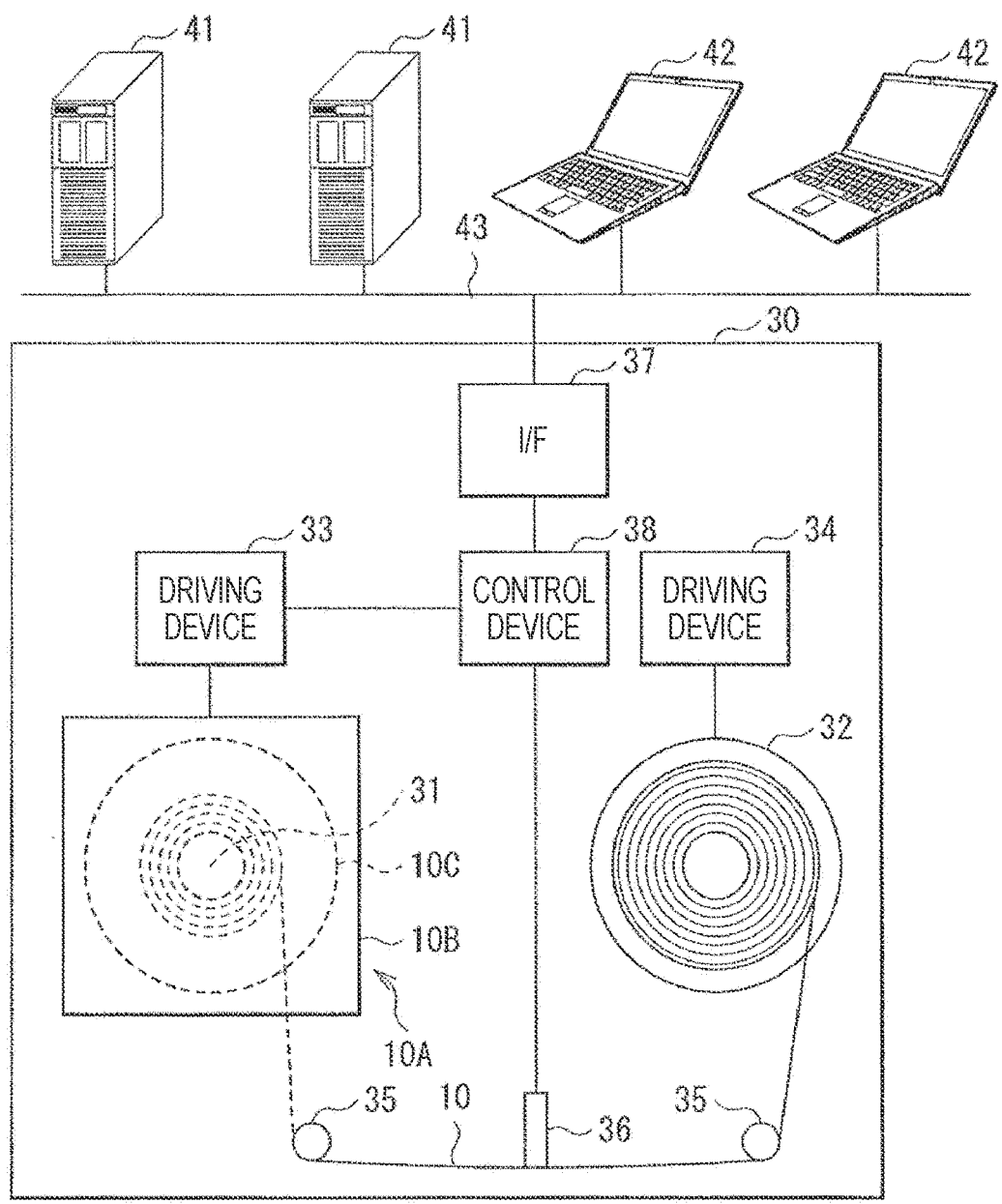
FIG. 7 is a schematic diagram of a recording/reproducing device using the magnetic recording medium illustrated in FIG. 1.

As illustrated in FIG. 7, the recording/reproducing device 30 includes a spindle 31, a reel 32, a driving device 33, a driving device 34, a plurality of guide rollers 35, a head unit 36, a communication interface (hereinafter referred to as I/F) 37, and a control device 38.

The spindle 31 can mount the magnetic recording medium cartridge 10A thereon. The magnetic recording medium cartridge 10A complies with the linear tape open (LTO) standard, and rotatably houses a single reel 10C in which the magnetic recording medium 10 is wound in a cartridge case 10B. A V-shaped servo pattern is recorded in advance as a servo signal on the magnetic recording medium 10. The reel 32 can fix a tip of the magnetic recording medium 10 pulled out from the magnetic recording medium cartridge 10A.

The driving device 33 rotationally drives the spindle 31. The driving device 34 rotationally drives the reel 32. When data is recorded or reproduced on the magnetic recording medium 10, the driving device 33 and the driving device 34 rotationally drive the spindle 31 and the reel 32, respectively, to cause the magnetic recording medium 10 to travel. The guide roller 35 is a roller for guiding traveling of the magnetic recording medium 10.

The head unit 36 includes a plurality of recording heads for recording a data signal in the magnetic recording medium 10 and a plurality of reproducing heads for reproducing a data signal recorded in the magnetic recording medium 10. As the recording head, for example, a ring type head can be used, and as the reproducing head, for example, a magnetoresistive effect type magnetic head can be used. However, the types of the recording head and reproducing head are not limited thereto.

The I/F 37 is for communicating with an information processing device such as the server 41 or the PC 42, and is connected to the network 43.

The control device 38 controls the entire recording/reproducing device 30. For example, the control device 38 causes the head unit 36 to record a data signal supplied from an information processing device such as the server 41 or the PC 42 on the magnetic recording medium 10 in response to a request from the information processing device. Furthermore, the control device 38 causes the head unit 36 to reproduce the data signal recorded in the magnetic recording medium 10 in response to a request from an information processing device such as the server 41 or the PC 42 and supplies the data signal to the information processing device.

Figure 8:
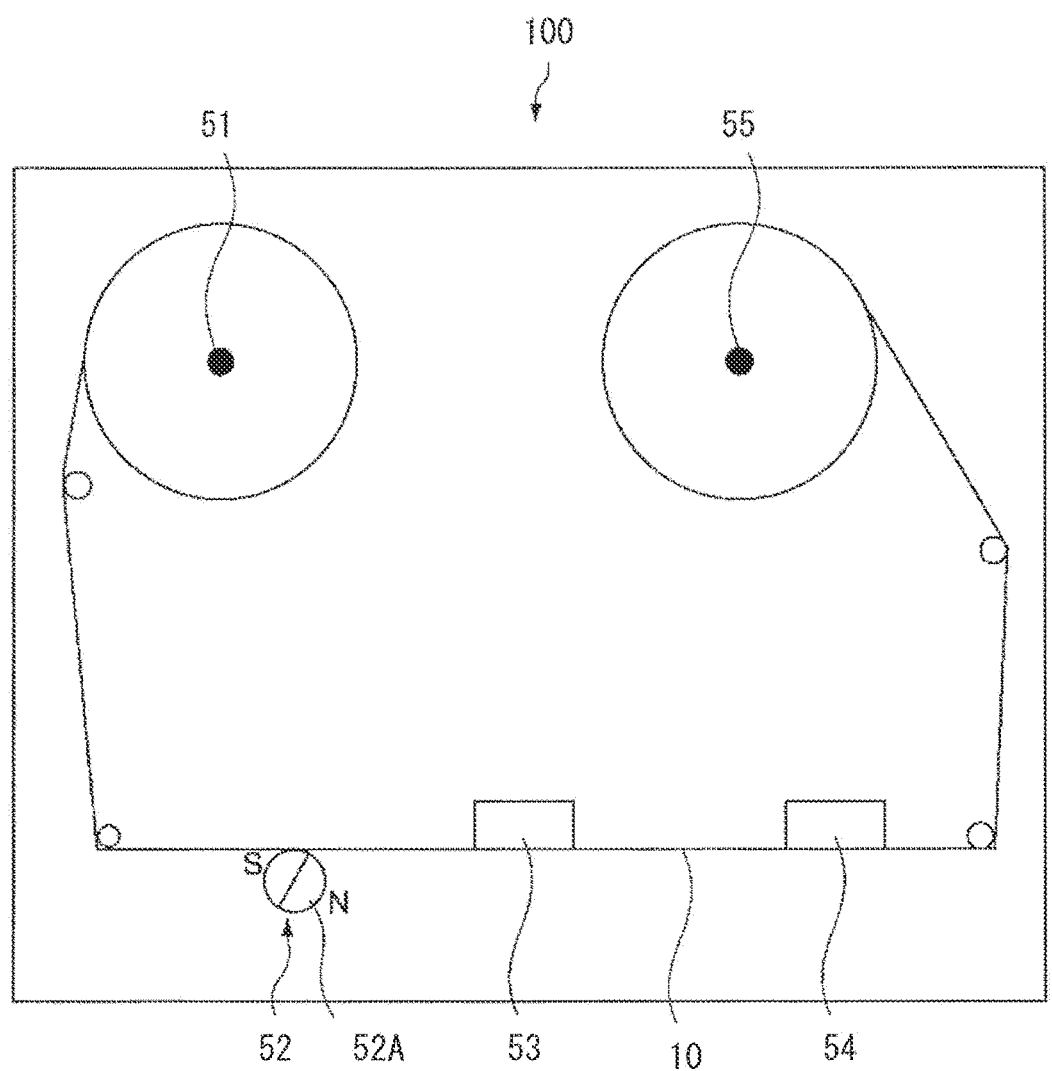
FIG. 8 is a schematic diagram of a servo signal recording device for recording a servo signal in the magnetic recording medium illustrated in FIG. 1.
Figure 9:
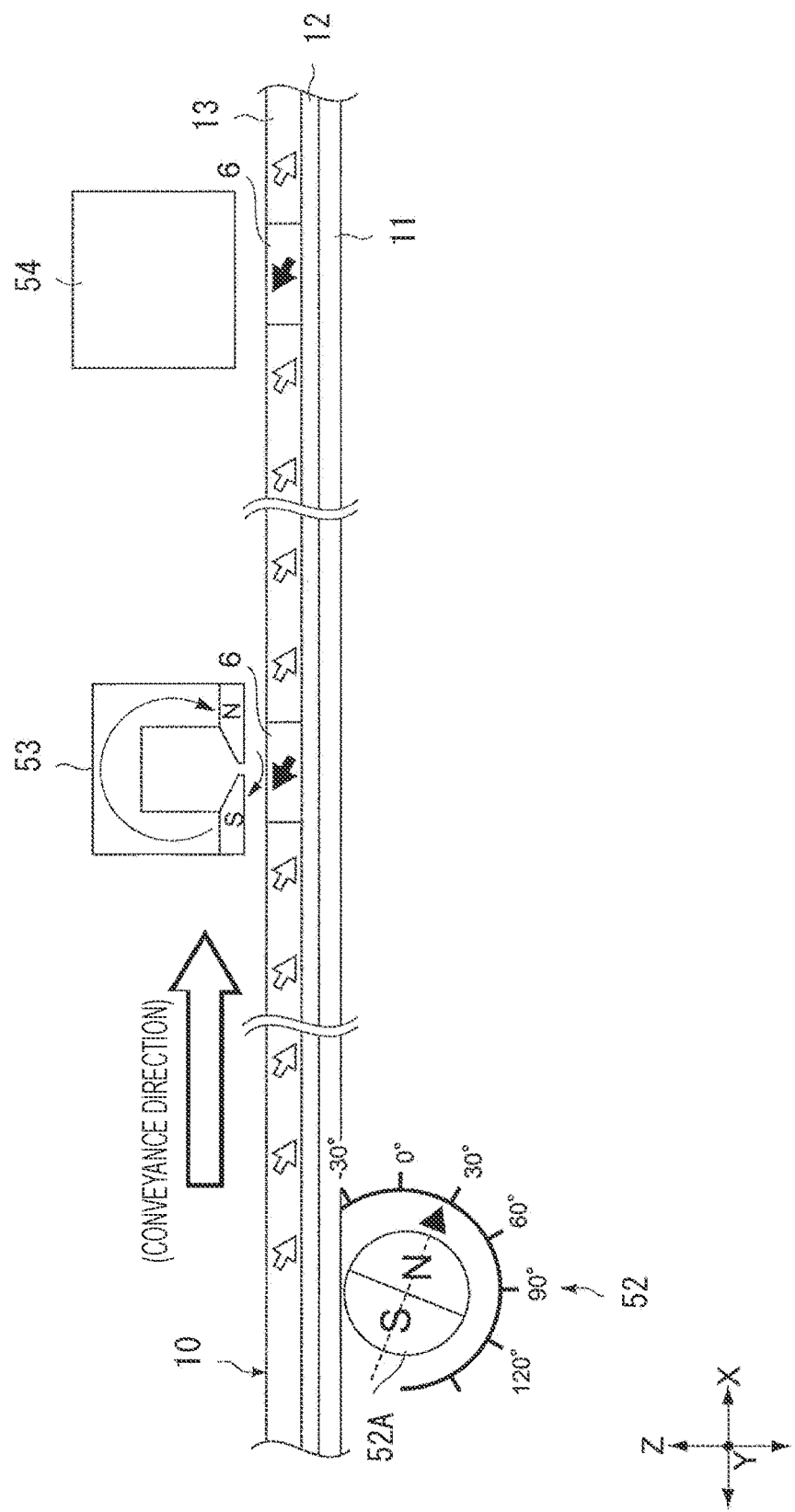
FIG. 9 is a schematic diagram illustrating a configuration of a main part of the servo signal recording device illustrated in FIG. 8 in an enlarged manner.

FIG. 8 is a front view illustrating the overall configuration of a servo signal recording device 100. FIG. 9 is a schematic diagram illustrating a configuration of a main part of the servo signal recording device 100 in an enlarged manner. As illustrated in FIG. 8, the servo signal recording device 100 includes a feeding roller 51, a pretreatment unit 52, a servo signal recording head 53, a servo signal reproducing head 54, and a winding roller 55 in order from upstream to downstream in a conveyance direction of the magnetic recording medium 10. Note that in FIG. 8, the back layer 14 of the magnetic recording medium 10 is omitted. Furthermore, the servo signal recording device 100 may include a control unit that comprehensively controls each unit of the servo signal recording device 100, a recording unit that stores various programs and data necessary for processing of the control unit, a display unit that displays data, and the like.

The feeding roller 51 can rotatably support the magnetic recording medium 10 (before the servo signal recording pattern 6 is recorded), which is a roll-shaped magnetic tape. The feeding roller 51 is rotated in response to drive of a drive source such as a motor, and feeds out the magnetic recording medium 10 downstream in response to the rotation.

The winding roller 55 can rotatably support the magnetic recording medium 10 in which the servo signal recording pattern 6 is recorded. The winding roller 55 rotates in synchronization with the feeding roller 51 in response to drive of a drive source such as a motor, and winds up the magnetic recording medium 10 in which the servo signal recording pattern 6 is recorded in response to the rotation. The feeding roller 51 and the winding roller 55 can move the magnetic recording medium 10 at a constant speed in a conveyance path.

The pretreatment unit 52 is disposed, for example, upstream of the servo signal recording head 53 and below the magnetic recording medium 10 (position opposite to a surface of the magnetic layer 13). However, the pretreatment unit 52 may be disposed above the magnetic recording medium 10 (position facing the surface of the magnetic layer 13). The pretreatment unit 52 includes a permanent magnet 52A that can rotate about a rotation axis in the Y-axis direction, that is, the width direction of the magnetic recording medium 10. The shape of the permanent magnet 52A is, for example, a cylindrical shape or a polygonal prism shape, but is not limited thereto.

Before the servo signal recording pattern 6 is recorded by the servo signal recording head 53, the permanent magnet 52A applies a magnetic field to the entire magnetic layer 13 by a DC magnetic field to degauss the entire magnetic layer 13. Therefore, the permanent magnet 52A can magnetize the magnetic layer 13 in a second direction opposite to the magnetization direction of the servo signal recording pattern 6 in advance (refer to the white arrow in FIG. 9). By making the two magnetization directions opposite to each other in this way, when the servo signal recording pattern 6 is read, reproduced waveforms of the servo signal recording pattern 6 can be made symmetrical in the vertical direction (±) (refer to FIG. 11 described later).

The servo signal recording head 53 is disposed, for example, above the magnetic recording medium 10 (position facing a surface of the magnetic layer 13). Note that the servo signal recording head 53 may be disposed below the magnetic recording medium 10 (opposite to the surface of the magnetic layer 13). The servo signal recording head 53 generates a magnetic field at a predetermined timing in response to a rectangular wave pulse signal, and applies the magnetic field to a part of the magnetic layer 13 (after pretreatment) of the magnetic recording medium 10.

Therefore, the servo signal recording head 53 magnetizes a part of the magnetic layer 13 in a first direction and records the servo signal recording pattern 6 in the magnetic layer 13 (refer to the black arrow in FIG. 9). The servo signal recording head 53 can record the servo signal recording pattern 6 for each of the five servo bands SB0 to SB4 when the magnetic layer 13 passes below the servo signal recording head 53.

The first direction, which is the magnetization direction of the servo signal recording pattern 6, includes a perpendicular component perpendicular to the upper surface of the magnetic layer 13. That is, in the present embodiment, since perpendicularly oriented or non-oriented magnetic powder is included in the magnetic layer 13, the servo signal recording pattern 6 recorded in the magnetic layer 13 includes a magnetization component in the perpendicular direction.

Figure 10:
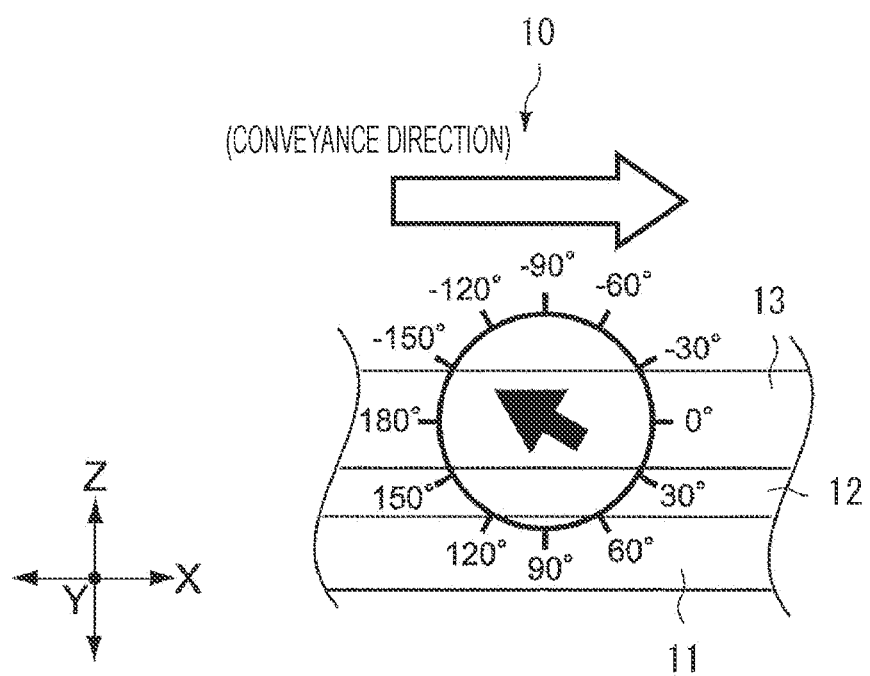
FIG. 10 is a schematic diagram illustrating a magnetization direction of the magnetic recording medium degaussed in the servo signal recording device illustrated in FIG. 8.

FIG. 10 is a diagram illustrating a magnetization direction of the magnetic recording medium 10. As illustrated in FIG. 10, in the present specification, an angle of the magnetization direction increases in a clockwise direction when an angle at which the magnetization direction faces the conveyance direction of the magnetic recording medium 10 is defined as a reference (0°). Although the magnetization direction of the servo signal recording pattern 6 is illustrated in FIG. 10, the same applies to the magnetization direction of magnetization after the pretreatment by the pretreatment unit 52 and the magnetization direction of the entire magnetic layer 13.

The magnetization direction (first direction) of the servo signal recording pattern 6 varies depending on a squareness ratio of the magnetic layer 13. For example, perpendicularly oriented barium ferrite, non-oriented barium ferrite, and perpendicularly oriented needle-shaped metal typically have different squareness ratios. In such a case, even if a magnetic field is applied to the servo signal recording unit 13 under the same conditions, the magnetization direction (first direction) of the servo signal recording pattern 6 is different among the perpendicularly oriented barium ferrite, the non-oriented barium ferrite, and the perpendicularly oriented needle-shaped metal. Conversely, if the squareness ratio is the same and the conditions of the servo signal recording head 53 are the same, the first direction is the same even if the types of the magnetic recording media 10 are different.

The magnetization direction (first direction) of the servo signal recording pattern 6 varies depending on a squareness ratio of the magnetic layer 13. Therefore, in order to match the magnetization direction of the servo signal recording pattern 6, it is necessary to make the magnetization direction (second direction) of pretreatment in the pretreatment unit 52 different.

In the present embodiment, the permanent magnet 52A is rotatable as a center of a rotation axis in the Y-axis direction. Therefore, the magnetization direction (second direction) by pretreatment can be appropriately adjusted depending on the type of the magnetic recording medium 10.

Regarding the angle of the permanent magnet 52A, there is an appropriate angle range depending on the type of the magnetic recording medium 10. Note that in the present specification, the angle of the permanent magnet 52A increases in a clockwise direction when an angle at which the N pole of the permanent magnet 52A faces the conveyance direction of the magnetic recording medium 10 is defined as a reference (0°).

Here, the servo signal recording head 53 overwrites the servo signal recording pattern 6 on the magnetic layer 13 magnetized in the second direction by the permanent magnet 52A. However, the first direction, which is the magnetization direction of the servo signal recording pattern 6, is constant regardless of the second direction as long as the squareness ratio of the magnetic layer 13 is the same.

The servo signal reproducing head 54 is disposed downstream of the servo signal recording head 53 and above the magnetic recording medium 10 (position facing the magnetic layer 13). The servo signal reproducing head 54 reads the servo signal recording pattern 6 from the magnetic layer 13 of the magnetic recording medium 10 which has been pretreated by the pretreatment unit 52 and in which the servo signal recording pattern 6 has been recorded by the servo signal recording head 53. A reproduced waveform of the servo signal recording pattern 6 read by the servo signal reproducing head 54 is displayed on a screen of a display unit.

Typically, the servo signal reproducing head 54 detects a magnetic flux generated from a surface of the servo band SB when the magnetic layer 13 passes below the servo signal reproducing head 54. The magnetic flux detected at this time is the reproduced waveform of the servo signal recording pattern 6.

Figure 11:
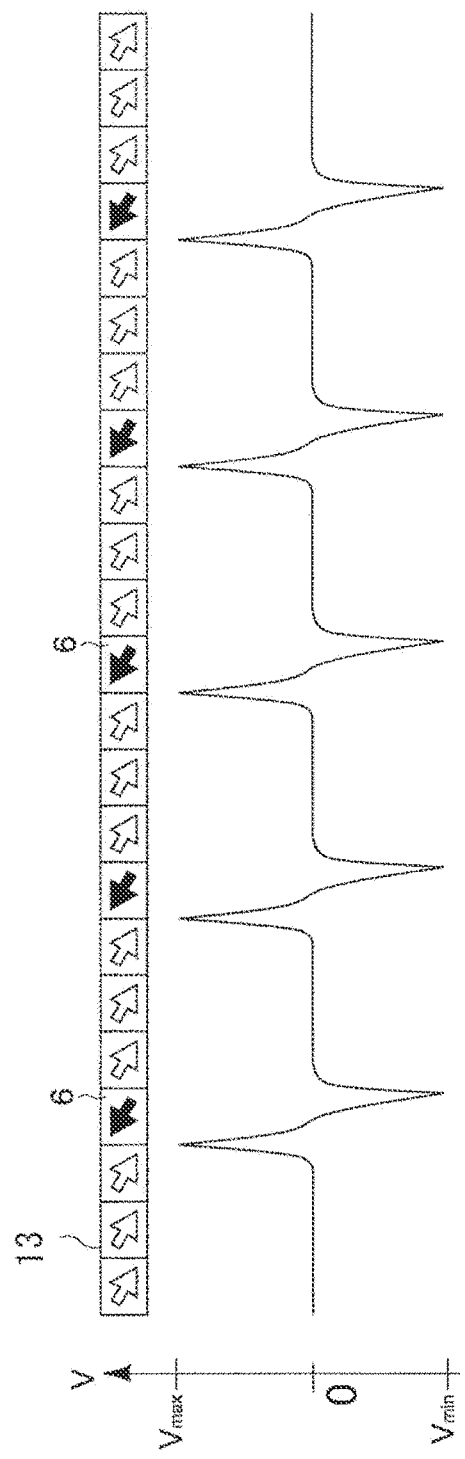
FIG. 11 is an explanatory diagram illustrating a relationship between a magnetization direction of the magnetic recording medium written in the servo signal recording device illustrated in FIG. 8 and a reproduced waveform of a servo signal.

FIG. 11 is a diagram illustrating a relationship between a magnetization direction and the reproduced waveform of the servo signal recording pattern 6.

As illustrated in FIG. 11, in the present embodiment, a magnetization direction of the servo signal recording pattern 6 and a magnetization direction by pretreatment are opposite to each other. Therefore, when the servo signal recording pattern 6 is read, the reproduced waveforms of the servo signal recording pattern 6 can be made symmetrical in the vertical direction (±). Note that in a case where the servo signal recording pattern 6 is recorded without performing pretreatment, the servo signal recording pattern 6 contains a magnetization component in the perpendicular direction. Therefore, the reproduced waveforms are asymmetrical in the vertical direction (±).

Moreover, in the present embodiment, the amount of magnetic flux generated in the vicinity of a surface of the magnetic layer 13 can be increased as compared with a case where the servo signal recording pattern 6 is recorded without performing pretreatment. Therefore, a high-output reproduced waveform can be obtained even in a case where the thickness of the magnetic layer 13 is thin.

Here, the magnetization direction (first direction) of the servo signal recording pattern 6 and the magnetization direction (second direction) by pretreatment do not have to be exactly opposite to each other, but only need to be substantially opposite to each other. This is related to the symmetry of the reproduced waveform of the servo signal recording pattern 6.

It is assumed that the magnetization direction of the servo signal recording pattern 6 and the magnetization direction by pretreatment are not exactly opposite to each other but are slightly deviated from each other. For example, it is assumed that the magnetization direction of the servo signal recording pattern 6 is −120° and the magnetization direction by pretreatment is 50° (refer to FIG. 10). Even in such a case, it is only required for the reproduced waveform of the servo signal recording pattern 6 to have symmetry to an extent that the servo signal recording pattern 6 can be appropriately read. The fact that the reproduced waveform of the servo signal recording pattern 6 has symmetry means that the magnetization direction (first direction) of the servo signal recording pattern 6 and the magnetization direction (second direction) by pretreatment are opposite to each other.

Determination of whether the reproduced waveform of the servo signal recording pattern 6 has symmetry or the reproduced waveform is asymmetrical will be described. For example, if a difference between a maximum voltage value Vmax of the reproduced waveform and a minimum voltage value Vmin (absolute value) of the reproduced waveform is within an allowable range (about 5% to 10%) with respect to an amplitude of the reproduced waveform, the reproduced waveform is determined to have symmetry.

[1-4 Effect]

As described above, the magnetic recording medium 10 of the present embodiment is a tape-shaped member in which the substrate 11, the base layer 12, and the magnetic layer 13 are sequentially laminated, and satisfies the following constituent requirements (1) to (9).

(1) The substrate 11 contains a polyester as a main component.

(2) The magnetic layer 13 is disposed on the substrate 11, includes a plurality of types of magnetic powder, and can record a data signal.

(3) Arithmetic average roughness Ra of a surface of the magnetic layer is 2.5 nm or less.

(4) PSD up to a spatial wavelength of 5 μm is 2.5 μm or less.

(5) An average thickness of the magnetic layer 13 is 90 nm or less.

(6) An average aspect ratio of magnetic powder in the magnetic layer 13 is 1.0 or more and 3.0 or less.

(7) A coercive force Hc1 in the perpendicular direction is 3000 oersted or less.

(8) A ratio Hc2/Hc1 of a coercive force Hc2 in a longitudinal direction to the coercive force Hc1 in the perpendicular direction is 0.8 or less.

(9) A half-value width PW50 of an isolated waveform in a reproduced waveform of a data signal is 200 nm or less.

With such a configuration, the magnetic recording medium 10 of the present embodiment can secure good electromagnetic conversion characteristics (for example, C/N) while making a magnetization transition width steep. Therefore, a configuration advantageous for high-density recording can be implemented.

(Basic Concept of Present Technology)

Here, the basic concept of the present technology will be described. In the present technology, we focus on a half-value width PW50 of an isolated waveform in a reproduced waveform of a data signal. Therefore, the half-value width PW50 of the isolated waveform will be described.

As illustrated in FIG. 11 described above, when a data signal is read, a reproduced waveform protrudes to a plus side and a minus side. The isolated waveform basically refers to either one of the waveforms.

Figure 12:
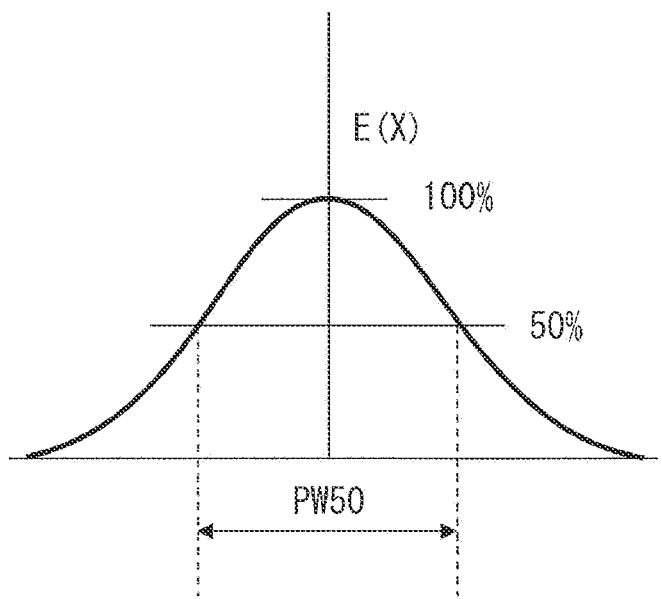
FIG. 12 is a diagram for explaining a half-value width in an isolated waveform.

FIG. 12 is a diagram for explaining the half-value width PW50 in the isolated waveform. In FIG. 12, the vertical axis indicates an intensity E(X) (arbitrary unit), and the horizontal axis indicates a length in a traveling direction. As illustrated in FIG. 12, the half-value width PW50 is the width of a waveform at the height of half (50%) of a maximum value (100%) in the reproduced waveform of the data signal.

This half-value width PW50 is a value indicating sharpness of a peak in the reproduced waveform of the data signal.

That is, as the half-value width PW50 becomes narrower, the peak in the reproduced waveform becomes sharper, and conversely, as the half-value width PW50 becomes wider, the sharpness of the peak in the reproduced waveform becomes duller.

Figure 13:
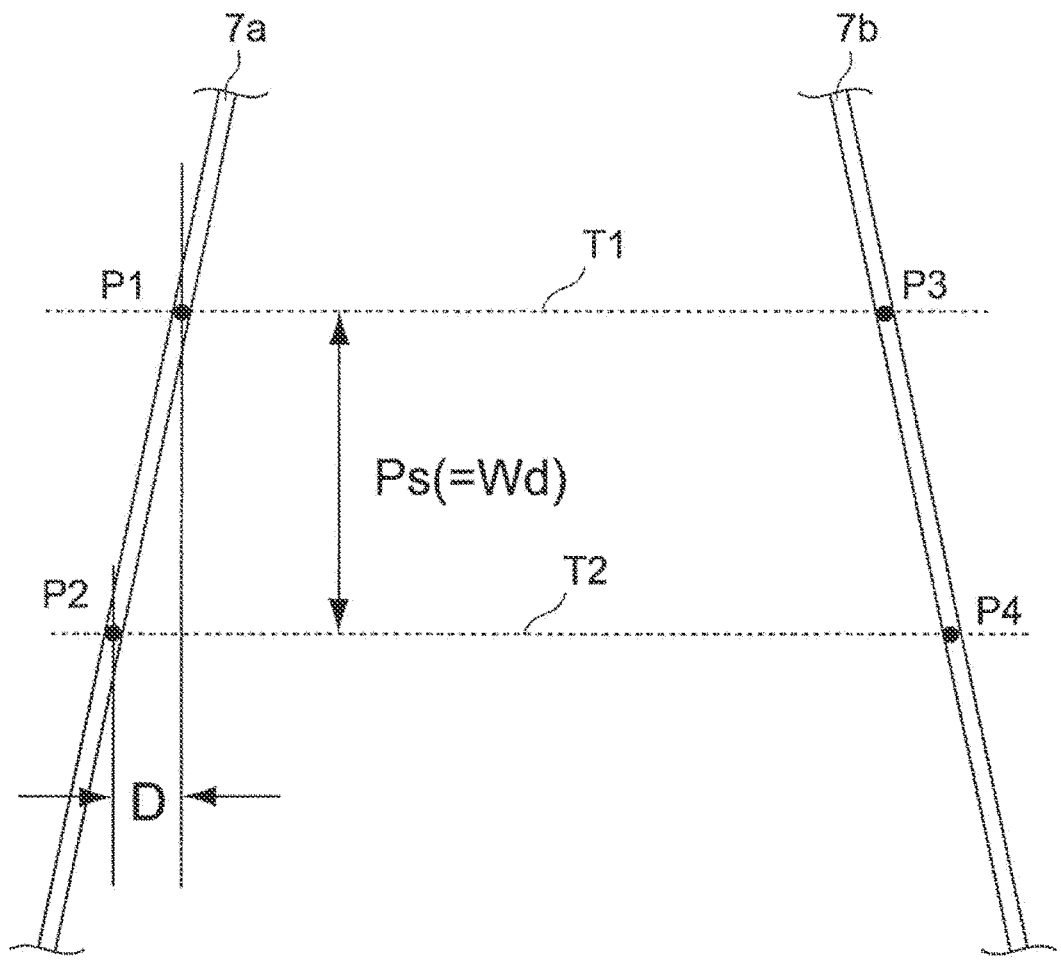
FIG. 13 is a diagram for explaining a basic concept of the present technology, and is a diagram illustrating two stripes in a servo signal recording pattern.

FIG. 13 is a diagram for explaining a basic concept of the present technology, and is a diagram illustrating two stripes 7 in the servo signal recording pattern 6.

As illustrated in FIG. 13, among the plurality of stripes 7 included in a first stripe group 8 of the servo signal recording pattern 6, any stripe 7 is defined as a first stripe 7a. Furthermore, among the plurality of stripes 7 included in a second stripe group 9 of the servo signal recording pattern 6, any stripe 7 is defined as a second stripe 7b. Furthermore, among a plurality of servo trace lines T, any servo trace line T is defined as a first servo trace line T1. Furthermore, a servo trace line T adjacent to the first servo trace line T1 is defined as a second servo trace line T2.

Furthermore, an intersection of the first stripe 7a and the first servo trace line T1 is defined as P1. Note that this P1 may be defined as any point on the first stripe 7a.

Furthermore, an intersection of the first stripe 7a and the second servo trace line T2 is defined as P2. Note that this P2 may be defined as a point on the first stripe 7a at a position separated from P1 by the interval Ps (that is, the recording track width Wd) in the width direction (Y-axis direction).

Furthermore, a distance between P1 and P2 in the longitudinal direction (X-axis direction) is defined as a distance D. The distance D corresponds to a deviation amount from an adjacent track in the longitudinal direction. Furthermore, an intersection of the second stripe 7b and the first servo trace line T1 is defined as P3, and an intersection of the second stripe 7b and the second servo trace line T2 is defined as P4.

When the first servo trace line T1 is traced, it is necessary to determine a difference between a time when a reproduced waveform is detected at P1 and a time when a reproduced waveform is detected at P3. This difference is defined as a first period. Similarly, when the second trace line T is traced, it is necessary to determine a difference between a time when a reproduced waveform is detected at P2 and a time when a reproduced waveform is detected at P4. This difference is defined as a second period.

Next, a difference between the first period and the second period will be considered. Here, it is assumed that the interval Ps between the servo trace lines T and the recording track width Wd are both 1.56 μm, and an azimuth angle α is 12 degrees. In this case, the distance D is 1.56×tan 12°, and is therefore 0.33 μm. A difference between the distance between P1 and P3 and the distance between P2 and P4 is twice the distance D, and is therefore 0.66 μm.

At this time, if a traveling speed of the magnetic recording medium 1 is 5 m/s, 0.13 μs is obtained by 0.66/5000000. This is the difference between the first period and the second period.

That is, in order to accurately trace the first servo trace line T1 and the second servo trace line T2, it is necessary to accurately determine a minute difference of 0.13 μs. This is because a data signal is recorded in an adjacent recording track 5 unless this determination can be performed.

However, in a case where the sharpness of a peak in a reproduced waveform of a data signal (FIG. 11) is dull, such a minute difference cannot be accurately determined. In particular, if the recording track width Wd is reduced and the interval Ps between the servo trace lines T is reduced in order to increase the number of recording tracks 5, the distance D is further narrowed, and the difference between the first period and the second period is further reduced.

Therefore, in the present technology, by setting the degree of perpendicular orientation of the magnetic layer 13 to a certain value or more, the half-value width of the isolated waveform in the reproduced waveform of the data signal is set to a certain value or less. Therefore, a peak in the reproduced waveform of the data signal is sharp.

More specifically, by setting the ratio Hc2/Hc1, which is an index of the degree of perpendicular orientation of the magnetic powder of the magnetic layer 13, to 0.8 or less, the half-value width of the isolated waveform can be set to 200 nm or less. Therefore, the peak in the reproduced waveform of the data signal can be sharpened to an extent that a minute difference (for example, 0.13 μs) as described above can be discerned (refer to Examples described later).

Moreover, in the present technology, in the magnetic layer 13, the PSD up to a spatial wavelength of 5 μm is set to a certain value or less, for example, 2.5 μm or less. By suppressing the PSD to a certain value or less, spacing between a recording/reproducing head and a tape during recording/reproducing can be reduced, and a medium more suitable for high recording density can be obtained.

(Elasticity and Tension Control of Magnetic Recording Medium 10)

Next, elasticity of the magnetic recording medium 10 and tension control of the magnetic recording medium 10 by the recording/reproducing device 30 will be described. In the LTO standard, the number of recording tracks is increasing rapidly due to a demand for high-density recording of data. In such a case, a recording track width is narrow, and a slight fluctuation in the width (Y-axis direction) of the magnetic recording medium 10 may be a problem.

For example, predetermined data is stored in the magnetic recording medium 10 by the recording/reproducing device 30, and then (for example, after storage for a certain period of time) the data recorded in the magnetic recording medium 10 is reproduced by the recording/reproducing device 30. In such a case, when the width of the magnetic recording medium 10 at the time of data reproduction fluctuates slightly compared to the width of the magnetic recording medium 10 at the time of data recording, off-track may occur (a data reproducing head in the head unit 36 may be positioned on a wrong recording track 5). For this reason, there is a possibility that data recorded in the magnetic recording medium 10 cannot be accurately reproduced and an error occurs.

Examples of a cause of the fluctuation in the width of the magnetic recording medium 10 include fluctuation in temperature, fluctuation in humidity, and the like.

In general, a technique is used in which the magnetic recording medium 10 is designed so as not to expand and contract to cope with fluctuation in the width of the magnetic recording medium 10. However, it is practically impossible to prevent the magnetic recording medium 10 from expanding and contracting completely.

Therefore, the present embodiment uses a technique which does not make it difficult for the magnetic recording medium 10 to expand and contract, but conversely, makes it easy for the magnetic recording medium 10 to expand and contract to some extent, and controls (increases or decreases) the tension of the magnetic recording medium 10 (X-axis direction: tension of the magnetic recording medium 10 in a conveyance direction thereof) in the recording/reproducing device 30.

Specifically, the recording/reproducing device 30 increases the tension of the magnetic recording medium 10 in the longitudinal direction (X-axis direction) as necessary (in a case where the width of the magnetic recording medium 10 is widened) during reproduction of a data signal to reduce the width (Y-axis direction) of the magnetic recording medium 10. Furthermore, the recording/reproducing device 30 reduces the tension of the magnetic recording medium 10 in the longitudinal direction as necessary (in a case where the width of the magnetic recording medium 10 is narrowed) during reproduction of a data signal to increase the width of the magnetic recording medium 10. Note that the recording/reproducing device 30 may control the tension of the magnetic recording medium 10 in the longitudinal direction not only during reproduction of a data signal but also during recording of the data signal.

According to such a method, for example, when the width of the magnetic recording medium 10 has fluctuated due to temperature and the like, by adjusting the width of the magnetic recording medium 10 as necessary, the width of the magnetic recording medium 10 can be constant. Therefore, it is considered that off-track can be prevented and data recorded in the magnetic recording medium 10 can be accurately reproduced.

2. MODIFICATION

Modification 1

Figure 14:
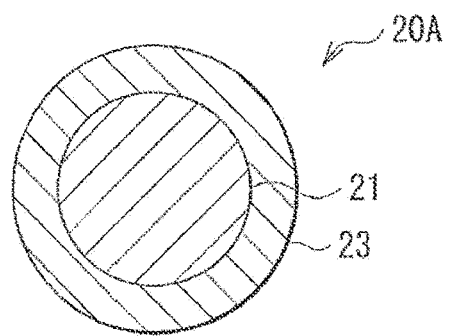
FIG. 14 is a cross-sectional view schematically illustrating a cross-sectional structure of an ε iron oxide particle as Modification 1.

In the embodiment described above, the ε iron oxide particle 20 (FIG. 2) having the two-layered shell portion 22 has been illustrated and described, but the magnetic recording medium of the present technology may include, for example, as illustrated in FIG. 14, an ε iron oxide particle 20A having a single-layered shell portion 23. The shell portion 23 in the ε iron oxide particle 20A has a similar configuration to the first shell portion 22a, for example. However, the ε iron oxide particle 20 having the two-layered shell portion 22 described in the embodiment described above is more preferable than the s iron oxide particle 20A of Modification 1 from a viewpoint of suppressing characteristic deterioration.

Modification 2

In the magnetic recording medium 10 according to the embodiment described above, the case where the ε iron oxide particle 20 having a core-shell structure has been illustrated and described. However, the ε iron oxide particle may include an additive instead of the core-shell structure, or may have a core-shell structure and include an additive. In this case, some of Fe atoms in the ε iron oxide particles are replaced with an additive. Even by inclusion of an additive in an ε iron oxide particle, a coercive force Hc of the entire ε iron oxide particles can be adjusted to a coercive force Hc suitable for recording. Therefore, recordability can be improved. The additive is a metal element other than iron, preferably a trivalent metal element, more preferably at least one of aluminum (Al), gallium (Ga), and indium (In), and still more preferably at least one of Al and Ga.

Specifically, the ε iron oxide containing an additive is an $\varepsilon\text{-Fe}_2\text{-xM}_x\text{O}_3$ crystal (in which M represents a metal element other than iron, preferably a trivalent metal element, more preferably at least one of Al, Ga, and In, and still more preferably at least one of Al and Ga. x satisfies, for example, 0<x<1).

Modification 3

The magnetic powder of the present disclosure may include powder of nanoparticles including hexagonal ferrite (hereinafter referred to as "hexagonal ferrite particles") instead of the powder of ε iron oxide particles. The hexagonal ferrite particle has, for example, a hexagonal plate shape or a substantially hexagonal plate shape. The hexagonal ferrite preferably includes at least one of barium (Ba), strontium (Sr), lead (Pb), and calcium (Ca), more preferably at least one of Ba and Sr. Specifically, the hexagonal ferrite may be, for example, barium ferrite or strontium ferrite. The barium ferrite may further include at least one of Sr, Pb, and Ca in addition to Ba. The strontium ferrite may further include at least one of Ba, Pb, and Ca in addition to Sr.

More specifically, the hexagonal ferrite has an average composition represented by a general formula $\text{MFe}_{12}\text{O}_{19}$. However, M represents at least one metal of Ba, Sr, Pb, and Ca, preferably at least one metal of Ba and Sr, for example. M may represent a combination of Ba and one or more metals selected from the group consisting of Sr, Pb, and Ca. Furthermore, M may represent a combination of Sr and one or more metals selected from the group consisting of Ba, Pb, and Ca. In the above general formula, some of Fe atoms may be replaced with other metal atoms.

In a case where the magnetic powder includes powder of hexagonal ferrite particles, the average particle size of the magnetic powder is preferably 50 nm or less, more preferably 40 nm or less, and still more preferably 30 nm or less. The average particle size of the magnetic powder is more preferably 25 nm or less, 22 nm or less, 21 nm or less, or 20 nm or less. Furthermore, the average particle size of the magnetic powder is, for example, 10 nm or more, preferably 12 nm or more, and more preferably 15 nm or more. Therefore, the average particle size of the magnetic powder including powder of hexagonal ferrite particles can be, for example, 10 nm or more and 50 nm or less, 10 nm or more and 40 nm or less, 12 nm or more and 30 nm or less, 12 nm or more and 25 nm or less, or 15 nm or more and 22 nm or less. In a case where the average particle size of the magnetic powder is the above upper limit value or less (for example, 50 nm or less, particularly 30 nm or less), in the magnetic recording medium 10 having a high recording density, good electromagnetic conversion characteristics (for example, SNR) can be obtained. In a case where the average particle size of the magnetic powder is the lower limit value described above or more (for example, 10 nm or more, preferably 12 nm or more), the dispersibility of the magnetic powder is further improved, and better electromagnetic conversion characteristics (for example, SNR) can be obtained.

In a case where the magnetic powder includes hexagonal ferrite particles, the average aspect ratio of the magnetic powder can be preferably 1 or more and 3.5 or less, more preferably 1 or more and 3.1 or less, or 2 or more and 3.1 or less, and still more preferably 2 or more and 3 or less. When the average aspect ratio of the magnetic powder is within the above numerical range, aggregation of the magnetic powder can be suppressed, and moreover, resistance applied to the magnetic powder can be suppressed when the magnetic powder is perpendicularly oriented in a step of forming the magnetic layer 13. This can improve the perpendicular orientation of the magnetic powder.

Note that the average particle size and average aspect ratio of the magnetic powder including powder of hexagonal ferrite particles are determined as follows. First, the magnetic recording medium 10 to be measured is processed to be thinned by a focused ion beam (FIB) method and the like. Thinning is performed in the length direction (longitudinal direction) of the magnetic tape. Cross-sectional observation is performed for the obtained thin sample such that the entire recording layer is included with respect to the thickness direction of the recording layer using a transmission electron microscope (H-9500 manufactured by Hitachi High-Technologies) with an acceleration voltage of 200 kV and an overall magnification of 500,000 times. Next, from the imaged TEM photograph, 50 particles each having a side surface directed to an observation surface are selected, and maximum plate thicknesses DA of the particles are measured. The maximum plate thicknesses DA thus determined are simply averaged (arithmetically averaged) to determine an average maximum plate thickness DAave. Subsequently, plate diameters DB of the particles of the magnetic powder are measured. Here, the plate diameter DB means the largest distance among distances between two parallel lines drawn from all angles so as to come into contact with an outline of each of the particles of the magnetic powder (so-called maximum Feret diameter). Subsequently, the measured plate diameters DB are simply averaged (arithmetically averaged) to determine an average plate diameter DBave. Then, an average aspect ratio (DBave/DAave) of the particles is determined from the average maximum plate thickness DAave and the average plate diameter DBave.

In a case where the magnetic powder includes powder of hexagonal ferrite particles, the average particle volume of the magnetic powder is preferably 5900 nm$^3$ or less, more preferably 500 nm$^3$ or more and 3400 nm$^3$ or less, and still more preferably 1000 nm$^3$ or more and 2500 nm$^3$ or less. When the average particle volume of the magnetic powder is 5900 nm$^3$ or less, a similar effect to that in a case where the average particle size of the magnetic powder is 30 nm or less can be obtained. Meanwhile, when the average particle volume of the magnetic powder is 500 nm$^3$ or more, a similar effect to a case where the average particle size of the magnetic powder is 12 nm or more can be obtained.

Note that the average particle volume of the magnetic powder is determined as follows. First, the average maximum plate thickness DAave and the average maximum plate diameter DBave are determined by the above-described method for calculating the average particle size of the magnetic powder. Next, an average volume V of the ε iron oxide particles is determined by the following formula (2).

[Numerical Formula 2]

$$V = \frac{3\sqrt{3}}{8} \times DA_{ave} \times DB_{ave} \times DB_{ave} \quad (2)$$

According to a particularly preferable embodiment of the present technology, the magnetic powder can be barium ferrite magnetic powder or strontium ferrite magnetic powder, and more preferably barium ferrite magnetic powder. Barium ferrite magnetic powder includes iron oxide magnetic particles having barium ferrite as a main phase (hereinafter referred to as "barium ferrite particles"). Barium ferrite magnetic powder has high data recording reliability. For example, barium ferrite magnetic powder keeps coercive force even in a high-temperature and high-humidity environment. Barium ferrite magnetic powder is preferable as magnetic powder from such a viewpoint.

The average particle size of the barium ferrite magnetic powder is 50 nm or less, more preferably 10 nm or more and 40 nm or less, and still more preferably 12 nm or more and 25 nm or less.

In a case where the magnetic layer 13 includes barium ferrite magnetic powder as magnetic powder, the average thickness tm [nm] of the magnetic layer 13 preferably satisfies 35 nm≤tm≤100 nm, and is particularly preferably 80 nm or less. Furthermore, the magnetic recording medium 10 has a coercive force Hc of preferably 160 kA/m or more and 280 kA/m or less, more preferably 165 kA/m or more and 275 kA/m or less, still more preferably 170 kA/m or more and 270 kA/m or less when the coercive force Hc is measured in a thickness direction (perpendicular direction) of the magnetic recording medium 10.

Modification 4

The magnetic powder may include powder of nanoparticles including Co-containing spinel ferrite (hereinafter referred to as "cobalt ferrite particles") instead of the powder of ε iron oxide particles. The cobalt ferrite particle preferably has uniaxial anisotropy. The cobalt ferrite particle has, for example, a cubic shape or a substantially cubic shape. The Co-containing spinel ferrite may further contain at least one selected from Ni, Mn, Al, Cu, and Zn in addition to Co.

The Co-containing spinel ferrite has, for example, an average composition represented by the following formula.

(Provided that in formula (1), M represents, for example, at least one metal of Ni, Mn, Al, Cu, and Zn). x represents a value within a range of 0.4≤x≤1.0. y represents a value within a range of 0≤y≤0.3. Provided that x and y satisfy a relationship of (x+y)≤1.0. z represents a value within a range of 3≤z≤4. Some of Fe atoms may be replaced with another metal element.)

In a case where the magnetic powder includes powder of cobalt ferrite particles, the average particle size of the magnetic powder is preferably 25 nm or less, and more preferably 10 nm or more and 23 nm or less. When the average particle size of the magnetic powder is 25 nm or less, good electromagnetic conversion characteristics (for example, SNR) can be obtained in the magnetic recording medium 10 having a high recording density. Meanwhile, when the average particle size of the magnetic powder is 10 nm or more, dispersibility of the magnetic powder is further improved, and better electromagnetic conversion characteristics (for example, SNR) can be obtained. In a case where the magnetic powder includes powder of cobalt ferrite particles, the average aspect ratio of the magnetic powder is similar to that of the embodiment described above. Furthermore, a method for calculating the average particle size and the average aspect ratio of the magnetic powder is determined in a similar manner to that of the embodiment described above.

The average particle volume of the magnetic powder is preferably 15000 nm$^3$ or less, and more preferably 1000 nm$^3$ or more and 12000 nm$^3$ or less. When the average particle volume of the magnetic powder is 15000 nm$^3$ or less, a similar effect to that in a case where the average particle size of the magnetic powder is 25 nm or less can be obtained. Meanwhile, when the average particle volume of the magnetic powder is 1000 nm$^3$ or more, a similar effect to a case where the average particle size of the magnetic powder is 10 nm or more can be obtained. Note that a method for calculating the average particle volume of the magnetic powder is similar to the method for calculating the average particle volume of the magnetic powder (the method for calculating the average particle volume in a case where the ε iron oxide particle has a cubic shape or a substantially cubic shape) in the embodiment described above.

The coercive force Hc of cobalt ferrite magnetic powder is preferably 2500 Oe or more, and more preferably 2600 Oe or more and 3500 Oe or less.

Modification 5

Figure 15:
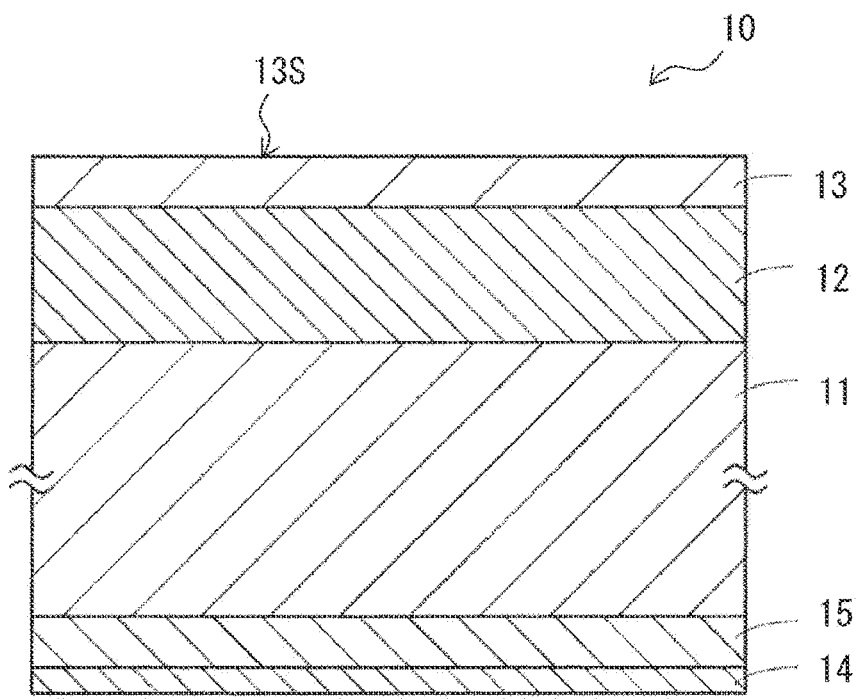
FIG. 15 is a cross-sectional view of a magnetic recording medium as Modification 5.

The magnetic recording medium 10 may further include a barrier layer 15 disposed on at least one surface of the substrate 11, for example, as illustrated in FIG. 15. The barrier layer 15 is a layer for suppressing a dimensional change according to an environment of the substrate 11. Examples of a cause of the dimensional change include a hygroscopic property of the substrate 11. However, by disposing the barrier layer 15, a penetration rate of moisture into the substrate 11 can be reduced. The barrier layer 15 includes, for example, a metal or a metal oxide. As the metal herein, for example, at least one of Al, Cu, Co, Mg, Si, Ti, V, Cr, Mn, Fe, Ni, Zn, Ga, Ge, Y, Zr, Mo, Ru, Pd, Ag, Ba, Pt, Au, and Ta can be used. As the metal oxide, for example, a metal oxide including one or more of the above metals can be used. More specifically, for example, at least one of $Al_2O_3$, CuO, CoO, $SiO_2$, $Cr_2O_3$, $TiO_2$, $Ta_2O_5$, and $ZrO_2$ can be used. Furthermore, the barrier layer 15 may include diamond-like carbon (DLC), diamond, and the like.

The average thickness of the barrier layer 15 is preferably 20 nm or more and 1000 nm or less, and more preferably 50 nm or more and 1000 nm or less. The average thickness of the barrier layer 15 is determined in a similar manner to the average thickness of the magnetic layer 13. However, a magnification of a TEM image is appropriately adjusted according to the thickness of the barrier layer 15.

Modification 6

In the embodiment described above, the case where the large number of holes are formed on the surface 13S of the magnetic layer 13 by transferring the large number of protrusions formed on the surface of the back layer 14 onto the surface 13S of the magnetic layer 13 has been described. However, the method for forming the large number of holes is not limited thereto. For example, the large number of holes may be formed on the surface 13S of the magnetic layer 13 by adjusting the type of a solvent included in the magnetic layer forming coating material, drying conditions of the magnetic layer forming coating material, and the like.

Modification 7

The magnetic recording medium 10 according to the embodiment described above may be used for a library device. In this case, the library device may include a plurality of the recording/reproducing devices 30 in the embodiment described above.

Modification 8

As described above, for example, the magnetic recording medium of the present disclosure is housed in the magnetic recording medium cartridge 10A in the recording/reproducing device 30 illustrated in FIG. 7 in a state of being wound on the reel 32. In this case, preferably, (the servo track width inside the winding of the magnetic recording medium)−(the servo track width outside the winding of the magnetic recording medium)>0 μm. In this Modification, (the servo track width inside the winding of the magnetic recording medium)−(the servo track width outside the winding of the magnetic recording medium) is also referred to as "a difference between the width of the servo track inside the winding and the width of the servo track outside the winding". The difference between the servo track width inside the winding and the servo track width outside the winding is preferably 0.01 μm or more, more preferably 0.02 μm or more, and still more preferably 0.05 μm or more. The difference between the servo track width inside the winding and the servo track width outside the winding may be, for example, 0.10 μm or more, 0.15 μm or more, or 0.20 μm or more. When the difference between the servo track width inside the winding and the servo track width outside the winding is within the above numerical range, generation of wrinkles in the magnetic recording medium wound on the reel in the cartridge (particularly a part of the magnetic recording medium closer to the reel) can be prevented. The wrinkles can cause, for example, a winding deviation or a track deviation during traveling. However, the present technology can also prevent occurrence of these phenomena caused by the wrinkles. The difference between the servo track width inside the winding and the servo track width outside the winding may be, for example, 2.5 μm or less, preferably 1.8 μm or less, and more preferably 1.5 μm or less, 1.0 μm or less, 0.8 or less, or 0.5 μm or less. When the difference between the servo track width inside the winding and the width of the servo track outside the winding is the above-described upper limit value or less, it is possible to more easily keep the width of the magnetic recording medium constant by adjusting a tension. A method for measuring the difference and a method for measuring a deviation amount of the servo track width used for calculating the difference will be described below.

((Servo track width inside winding)−(Servo track width outside winding)

The difference between the servo track width inside the winding and the servo track width outside the winding is more than 0 μm, preferably 0.0 μm or more, more preferably 0.02 μm or more, and still more preferably 0.05 μm or more. The difference between the servo track width inside the winding and the servo track width outside the winding may be, for example, 0.10 μm or more, 0. μm or more, or 0.20 μm or more. Therefore, generation of wrinkles in the magnetic recording medium wound on the reel in the cartridge can be prevented. The difference between the servo track width inside the winding and the servo track width outside the winding may be, for example, 2.5 μm or less, preferably 1.8 μm or less, and more preferably 1.5 μm or less, 1.0 μm or less, 0.8 or less, or 0.5 μm or less.

In order to determine the difference between the servo track width inside the winding and the servo track width outside the winding, a deviation amount TinW of the servo track width inside the winding of the magnetic recording medium and a deviation amount ToutW of the servo track width outside the winding of the magnetic recording medium are measured. The measurement is performed in an environment with a temperature of 23±3° C. and a relative humidity of 50%±5%. Each of these deviation amounts indicates how large or small a servo track width is with respect to a standard servo track width. A method for measuring these deviation amounts will be described separately below. In the present specification, inside the winding means a region from a position as a starting point 50 m apart from an end (hereinafter, also referred to as "inner end") attached to a reel (reel on which the magnetic recording medium is wound) in the magnetic recording cartridge out of two ends of the magnetic recording medium to a position 10 m ahead of the position toward the end opposite to the inner end (hereinafter, also referred to as "outer end"). In the present specification, outside the winding means a region from a position as a starting point 50 m apart from the outer end out of the two ends of the magnetic recording medium to a position 10 m ahead of the position toward the inner end.

Figure 16:
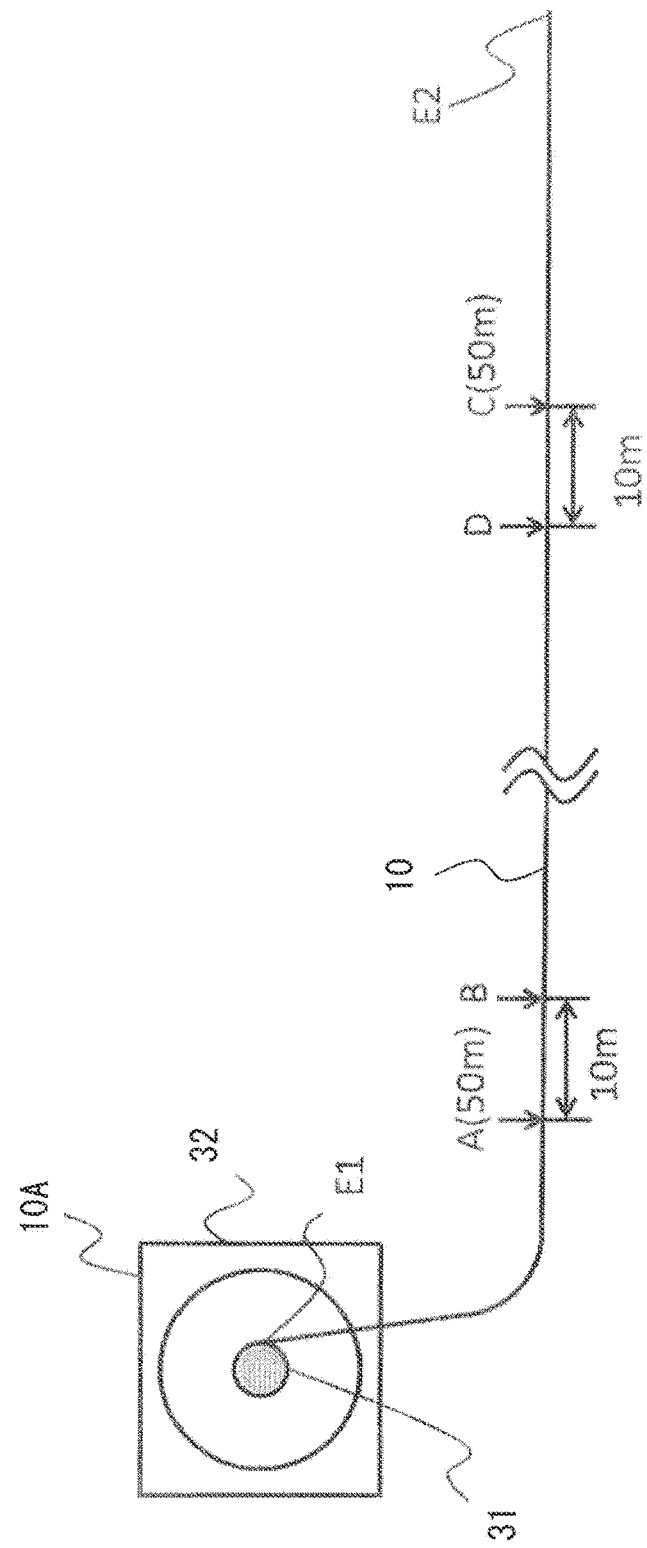
FIG. 16 is a schematic diagram illustrating a state in which an inner end of the magnetic recording medium is attached to a reel of a magnetic recording medium cartridge.

Inside the winding and outside the winding will be described more specifically with reference to FIG. 16. FIG. 16 illustrates a state in which an inner end E1 of the magnetic recording medium 10 is attached to the reel 32 of the magnetic recording medium cartridge 10A to be mounted on the recording/reproducing device 30. A region between a position A 50 m ahead of the inner end E1 and a position B 10 m ahead of the position A toward an outer end E2 is inside the winding. A region between a position C 50 m ahead of the outer end E2 toward the inner end E1 and a position D 10 m ahead of the position C toward the inner end E1 is outside the winding. The measurement of the deviation amount TinW of the servo track width inside the winding is performed while the magnetic recording medium 10 housed in the magnetic recording medium cartridge 10A is caused to travel so as to be wound into the recording/reproducing device 30 (while the magnetic recording medium 10 is caused to travel in a so-called forward direction). In the measurement, a tension applied to the magnetic recording medium 10 is 0.55 N, and a traveling speed is 3 to 6 m/s. An average value of the deviation amounts of the servo track width measured over the region of 10 m inside the winding is used as the deviation amount inW of the servo track width inside the winding for determining the difference. The average value is calculated by simple average.

The measurement of the deviation amount ToutW of the servo track width outside the winding is also performed while the magnetic recording medium 10 is caused to travel in a forward direction in a similar manner to that inside the winding. The average value of the deviation amounts of the servo track width measured over the region of 10 m outside the winding is used as the deviation amount ToutW of the servo track width outside the winding for determining the difference. The average value is also calculated by simple average.

By subtracting the deviation amount ToutW of the servo track width outside the winding from the deviation amount TinW of the servo track width inside the winding obtained as described above, the difference (TinW−ToutW) can be determined, and the difference is (servo track width inside winding)−(servo track width outside winding).

(Deviation Amount of Servo Track Width)

A method for measuring a deviation amount of a servo track width will be described with reference to FIG. 17. FIG. 17(a) is a schematic diagram of a data band and a servo band formed in a magnetic layer of a magnetic recording medium. As illustrated in FIG. 17(a), the magnetic layer has four data bands d0 to d3. The magnetic layer has five servo bands S0 to S4 in total such that each data band is sandwiched between two servo bands. As illustrated in FIG. 17(b), each servo band repeatedly has a frame unit including five servo signals S5a inclined at a predetermined angle θ1, five servo signals S5b inclined at the same angle in the opposite direction to the servo signals S5a, four servo signals S4a inclined at the predetermined angle θ1, and four servo signals S4b inclined at the same angle in the opposite direction to the servo signals S4a. The predetermined angle θ1 can be, for example, 5° to 25°, and particularly 11° to 20°.

The deviation amount of the servo track width measured by the above measurement method is a deviation amount of a servo track width between two servo tracks S1 and S2 sandwiching the second data band d1 from the top in FIG. 17(a) with respect to a standard servo track width. When the two servo tracks S1 and S2 sandwiching the data band d1 are reproduced while drive traveling, a digital oscilloscope (WAVEPRO 960 manufactured by Lecroy) obtains a waveform as illustrated in FIG. 17(c) for each servo track. Time between timing signals is obtained from the waveform obtained by reproduction of the servo track S1, and a distance between a head magnetic stripe of A burst and a head magnetic stripe of B burst in the servo track S1 is calculated from the time and a tape traveling speed. For example, as illustrated in FIG. 17(b), a distance L1 between a head magnetic stripe of A burst S5a-1 (the leftmost magnetic stripe out of the five magnetic stripes) and a head magnetic stripe of B burst S5b-1 (the leftmost magnetic stripe out of the five magnetic stripes) is calculated. Similarly, time between timing signals is obtained from the waveform obtained by reproduction of the servo track S2, and a distance between a head magnetic stripe of A burst and a head magnetic stripe of B burst in the servo track S2 is calculated from the time and a tape traveling speed. For example, as illustrated in FIG. 17(b), a distance L2 between a head magnetic stripe of A burst S5a-2 and a head magnetic stripe of B burst S5b-2 is calculated. For example, in a case where the magnetic recording tape spreads in the width direction, for example, time between timing signals obtained by reproduction of the servo track S1 is long, and as a result, the calculated distance L1 can also be large. In a case where the magnetic recording tape shrinks in the width direction, on the contrary, the calculated distance L1 can be small. Therefore, by using the distances L1 and L2 and an azimuth angle, the deviation amount of the servo track width can be determined. The deviation amount of the servo track width can be determined from the following formula.

$$(\text{Deviation amount of servo track width}) = \{(L1-L2)/2\} \times \tan(90° - \theta 1)$$

In this formula, L1 and L2 are the distances L1 and L2 described above, respectively, θ1 is the inclination angle θ1 described above, which is also referred to as an azimuth angle. θ1 is determined by developing a magnetic recording medium taken out from a cartridge with a ferri colloid developer and using a universal tool microscope (TOPCON TUM-220ES) and a data processing device (TOPCON CA-1B).

The deviation amount of the servo track width is a change amount with respect to a standard servo track width. The standard servo track width may be the same width as a servo lead head width of the magnetic recording/reproducing device, and may be determined depending on the type of the magnetic recording medium 10 such as the standard to which the magnetic recording medium 10 conforms.

Note that the servo track width can be adjusted as follows, for example. In order to alleviate a strain generated in the magnetic recording medium 10, a winding tension may be lowered in a drying step and/or a calendering step (heating region) of the magnetic recording medium 10. Furthermore, in order to alleviate a strain in a pancake state and/or a cartridge state after cutting, storage at a temperature of 55° C. or higher for a long time may be performed. By alleviating a strain in this way, the servo track width can be adjusted.

As in this Modification, by satisfying (servo track width inside the winding of the magnetic recording medium)−(servo track width outside the winding of the magnetic recording medium)>0, generation of wrinkles inside the winding in the cartridge can be suppressed.

EXAMPLES

Hereinafter, the present disclosure will be described specifically with Examples, but the present disclosure is not limited only to these Examples.

In the following Examples and Comparative Examples, an average aspect ratio of magnetic powder in a perpendicular direction, an average particle size of the magnetic powder, an average particle volume of the magnetic powder, an average thickness of a base layer, an overall average thickness of a magnetic recording medium (tape average thickness), an average thickness of a magnetic layer, a coercive force Hc1, a coercive force Hc2, a ratio Hc2/Hc1, arithmetic average roughness (magnetic layer Ra) of a surface of the magnetic layer, magnetic layer PSD (≤0.5 µm), and a half-value width PW50 of an isolated waveform are values determined by the measurement method described in the above-described embodiment.

Example 1

A magnetic recording medium as Example 1 was obtained as follows.

<Step of Preparing a Magnetic Layer Forming Coating Material>

A magnetic layer forming coating material was prepared as follows. First, a first composition having the following formulation was kneaded with an extruder. Next, the kneaded first composition and a second composition having the following formulation were added to a stirring tank equipped with a disper, and were premixed. Subsequently, the mixture was further subjected to sand mill mixing, and was subjected to a filter treatment to prepare a magnetic layer forming coating material.

(First Composition)

Each component and weight in the first composition are as follows.

Powder of barium ferrite ($BaFe_{12}O_{19}$) particles (hexagonal plate shape, average aspect ratio 2.8, average particle size 20.3 nm, average particle volume 1950 $nm^3$): 100 parts by mass Vinyl chloride-based resin (cyclohexanone solution 30% by mass): 40 parts by mass (including cyclohexanone solution)

(Degree of polymerization: 300, Mn=10000, $OSO_3K$=0.07 mmol/g and secondary OH=0.3 mmol/g were included as polar groups)

Aluminum oxide powder ($\alpha$-$Al_2O_3$, average particle diameter 0.2 µm): 5 parts by mass Carbon black (manufactured by Tokai Carbon Co., Ltd., trade name: Seast TA): 2 parts by mass (Second Composition)

Each component and weight in the second composition are as follows.

Vinyl chloride-based resin: 20 parts by mass (including cyclohexanone solution)

(Resin solution: resin content 30% by mass, cyclohexanone 70% by mass)

n-Butyl stearate as a fatty acid ester: 2 parts by mass
Methyl ethyl ketone: 121.3 parts by mass
Toluene: 121.3 parts by mass
Cyclohexanone: 60.7 parts by mass To the magnetic layer forming coating material prepared as described above, 4 parts by mass of polyisocyanate (trade name: Coronate L, manufactured by Nippon Polyurethane Industry Co., Ltd.) as a curing agent and 2 parts by mass of stearic acid as a fatty acid were added.

<Step of Preparing Base Layer Forming Coating Material>

A base layer forming coating material was prepared as follows. First, a third composition having the following formulation was kneaded with an extruder. Next, the kneaded third composition and a fourth composition having the following formulation were added to a stirring tank equipped with a disper, and were premixed. Subsequently, the mixture was further subjected to sand mill mixing, and was subjected to a filter treatment to prepare a base layer forming coating material.

(Third Composition)

Each component and weight in the third composition are as follows.

Acicular iron oxide powder ($\alpha$-$Fe_2O_3$, average major axis length 0.15 µm): 100 parts by mass Vinyl chloride-based resin (resin solution: resin content 30% by mass, cyclohexanone 70% by mass): 55.6 parts by mass Carbon black (average particle diameter 20 nm): 10 parts by mass (Fourth Composition)

Each component and weight in the fourth composition are as follows.

Polyurethane-based resin UR8200 (manufactured by Toyobo Co., Ltd.): 18.5 parts by mass
n-Butyl stearate as a fatty acid ester: 2 parts by mass
Methyl ethyl ketone: 108.2 parts by mass
Toluene: 108.2 parts by mass
Cyclohexanone: 18.5 parts by mass To the base layer forming coating material prepared as described above, 4 parts by mass of polyisocyanate (trade name: Coronate L, manufactured by Nippon Polyurethane Industry Co., Ltd.) as a curing agent and 2 parts by mass of stearic acid as a fatty acid were added.

<Step of Preparing a Back Layer Forming Coating Material>

A back layer forming coating material was prepared as follows. The following raw materials were mixed in a stirring tank equipped with a disper, and were subjected to filter treatment to prepare a back layer forming coating material.

Carbon black powder having a small particle diameter (average particle diameter (D50) 20 nm): 90 parts by mass Carbon black powder having a large particle diameter (average particle diameter (D50) 270 nm): 10 parts by mass Polyester polyurethane (manufactured by Nippon Polyurethane Industry Co., Ltd., trade name: N-2304): 100 parts by mass Methyl ethyl ketone: 500 parts by mass
Toluene: 400 parts by mass
Cyclohexanone: 100 parts by mass <Application Step>

Using the magnetic layer forming coating material and the base layer forming coating material prepared as described above, a base layer having an average thickness of 1.1 µm and a magnetic layer having an average thickness of 80 nm were formed on one main surface of a long polyester film having an average thickness of 4.0 µm as a nonmagnetic support as follows. First, the base layer forming coating material was applied onto one main surface of the polyester film and dried to form a base layer. Next, the magnetic layer forming coating material was applied onto the base layer and dried to form a magnetic layer. Note that the magnetic powder was subjected to magnetic field orientation in a thickness direction of the film by a solenoid coil when the magnetic layer forming coating material was dried. Furthermore, drying conditions (drying temperature and drying time) of the magnetic layer forming coating material were adjusted, and the coercive force Hc1 of the magnetic recording medium in the thickness direction (perpendicular direction) and the coercive force Hc2 thereof in the longitudinal direction were set to the values illustrated in Table 1 indicated below. Subsequently, the back layer forming coating material was applied onto the other main surface of the polyester film and dried to form a back layer having an average thickness of 0.3 μm.

<Calendering Step and Transfer Step>

Subsequently, calendering was performed to smooth a surface of the magnetic layer. Next, the magnetic recording medium having a smooth surface of the magnetic layer was wound into a roll shape, and then the magnetic recording medium was heated at 60° C. for 10 hours in this state. Then, the magnetic recording medium was rewound in a roll shape such that an end located on an inner circumferential side was located on an outer circumferential side oppositely, and then the magnetic recording medium was heated again at 60° C. for 10 hours in this state. Therefore, a large number of protrusions on the surface of the back layer were transferred onto the surface of the magnetic layer to form a large number of holes on the surface of the magnetic layer.

<Cutting Step>

The magnetic recording medium obtained as described above was cut into a width of ½ inches (12.65 mm). Therefore, the target long magnetic recording medium (average thickness 5.6 μm) was obtained. As indicated in Table 2 below, this magnetic recording medium has a four-layer structure, an overall average thickness (tape average thickness) of 5.6 μm, five servo tracks, and an average substrate (base film) thickness of 4.0 μm. Furthermore, W is 2.9 μm and L is 0.052 μm. The above configuration is referred to as a media configuration 1. Furthermore, W represents a recording track width, and L represents a distance between magnetization reversals (bit length) of a portion recorded at the shortest wavelength. Note that the obtained magnetic recording medium had a magnetic layer Ra of 1.9 nm, a magnetic layer PSD of 2.1 μm, and a half-value width PW50 of an isolated waveform of 175 nm in a reproduced waveform.

Example 2

In the step of preparing the magnetic layer forming coating material, barium ferrite ($BaFe_{12}O_{19}$) particles in the first composition had a powder average aspect ratio of 2.6, an average particle size of 18.6 nm, and an average particle volume of 1600 $nm^3$. Furthermore, in the application step, the magnetic layer had an average thickness of 60 nm, the coercive force Hc1 was 2920 Oe, and the coercive force Hc2 was 1920 Oe. A magnetic recording medium as Example 2 was obtained in a similar manner to Example 1 described above except for the points described above. Note that the obtained magnetic recording medium had a magnetic layer Ra of 1.85 nm, a magnetic layer PSD of 2.0 μm, and a half-value width PW50 of an isolated waveform of 170 nm in a reproduced waveform.

Example 3

In the step of preparing the magnetic layer forming coating material, barium ferrite ($BaFe_{12}O_{19}$) particles in the first composition had a powder average aspect ratio of 3.0, an average particle size of 21.3 nm, and an average particle volume of 2100 $nm^3$. A magnetic recording medium as Example 3 was obtained in a similar manner to Example 1 described above except for the points described above. Note that the obtained magnetic recording medium had a magnetic layer Ra of 1.9 nm, a magnetic layer PSD of 2.1 μm, and a half-value width PW50 of an isolated waveform of 177 nm in a reproduced waveform.

Example 4

A magnetic recording medium as Example 4 was obtained in a similar manner to Example 1 described above except that the magnetic layer had an average thickness of 90 nm in the application step. Note that the obtained magnetic recording medium had a magnetic layer Ra of 1.9 nm, a magnetic layer PSD of 2.1 μm, and a half-value width PW50 of an isolated waveform of 175 nm in a reproduced waveform.

Example 5

In the step of preparing the magnetic layer forming coating material, barium ferrite ($BaFe_{12}O_{19}$) particles in the first composition had a powder average aspect ratio of 2.9, an average particle size of 20.9 nm, and an average particle volume of 2050 $nm^3$. Furthermore, in the application step, the coercive force Hc1 was 2980 Oe. A magnetic recording medium as Example 5 was obtained in a similar manner to Example 1 described above except for the points described above. Note that the obtained magnetic recording medium had a magnetic layer Ra of 1.9 nm, a magnetic layer PSD of 2.1 μm, and a half-value width PW50 of an isolated waveform of 177 nm in a reproduced waveform.

Example 6

In the step of preparing the magnetic layer forming coating material, powder of ε iron oxide particles (spherical shape, average aspect ratio 1.3, average particle size 15.7 nm, particle volume 2050 $nm^3$) was used as the magnetic powder. Furthermore, in the application step, the coercive force Hc1 was 2850 Oe, and the coercive force Hc2 was 2020 Oe. A magnetic recording medium as Example 6 was obtained in a similar manner to Example 1 described above except for the points described above. Note that the obtained magnetic recording medium had a magnetic layer Ra of 2 nm, a magnetic layer PSD of 2.1 μm, and a half-value width PW50 of an isolated waveform of 177 nm in a reproduced waveform.

Example 7

In the step of preparing the magnetic layer forming coating material, cobalt ferrite powder (cubic shape, average aspect ratio 1.1, average particle size 12.6 nm, particle volume 2030 $nm^3$) was used as the magnetic powder. Furthermore, in the application step, the coercive force Hc1 was 2800 Oe, and the coercive force Hc2 was 2020 Oe. A magnetic recording medium as Example 7 was obtained in a similar manner to Example 1 described above except for the points described above. Note that the obtained magnetic recording medium had a magnetic layer Ra of 2 nm, a magnetic layer PSD of 2.1 μm, and a half-value width PW50 of an isolated waveform of 177 nm in a reproduced waveform.

Example 8

In the step of preparing the magnetic layer forming coating material, barium ferrite ($BaFe_{12}O_{19}$) particles in the first composition had a powder average aspect ratio of 2.3, an average particle size of 17 nm, and an average particle volume of 1400 $nm^3$. Furthermore, in the application step, the magnetic layer had an average thickness of 60 nm, the coercive force Hc1 was 2550 Oe, and the coercive force Hc2 was 1820 Oe. A magnetic recording medium as Example 8 was obtained in a similar manner to Example 1 described above except for the points described above. Note that the obtained magnetic recording medium had a magnetic layer Ra of 1.8 nm, a magnetic layer PSD of 1.9 μm, and a half-value width PW50 of an isolated waveform of 170 nm in a reproduced waveform.

Example 9

In the step of preparing the magnetic layer forming coating material, barium ferrite ($BaFe_{12}O_{19}$) particles in the first composition had a powder average aspect ratio of 2.0, an average particle size of 15 nm, and an average particle volume of 1100 $nm^3$. Furthermore, in the application step, the magnetic layer had an average thickness of 60 nm, the coercive force Hc1 was 2500 Oe, and the coercive force Hc2 was 1840 Oe. A magnetic recording medium as Example 9 was obtained in a similar manner to Example 1 described above except for the points described above. Note that the obtained magnetic recording medium had a magnetic layer Ra of 1.75 nm, a magnetic layer PSD of 1.8 μm, and a half-value width PW50 of an isolated waveform of 160 nm in a reproduced waveform.

Example 10

A magnetic recording medium as Example 10 was obtained in a similar manner to Example 1 described above except that the media configuration was set to 2 (Table 2). Note that the obtained magnetic recording medium had a magnetic layer Ra of 1.9 nm, a magnetic layer PSD of 2.1 μm, and a half-value width PW50 of an isolated waveform of 175 nm in a reproduced waveform.

Example 11

The media configuration was set to 3 (Table 2). In the step of preparing the magnetic layer forming coating material, barium ferrite ($BaFe_{12}O_{19}$) particles in the first composition had a powder average aspect ratio of 2.6, an average particle size of 18.6 nm, and an average particle volume of 1600 $nm^3$. Furthermore, in the application step, the magnetic layer had an average thickness of 60 nm, the coercive force Hc1 was 2920 Oe, and the coercive force Hc2 was 1920 Oe. Moreover, the average tape thickness was 5.2 μm. A magnetic recording medium as Example 11 was obtained in a similar manner to Example 1 described above except for the points described above. Note that the obtained magnetic recording medium had a magnetic layer Ra of 1.85 nm, a magnetic layer PSD of 2.0 μm, and a half-value width PW50 of an isolated waveform of 168 nm in a reproduced waveform.

Example 12

The media configuration was set to 4 (Table 2). In the step of preparing the magnetic layer forming coating material, barium ferrite ($BaFe_{12}O_{19}$) particles in the first composition had a powder average aspect ratio of 2.3, an average particle size of 17 nm, and an average particle volume of 1400 $nm^3$. Furthermore, in the application step, the magnetic layer had an average thickness of 60 nm, the coercive force Hc1 was 2550 Oe, and the coercive force Hc2 was 1820 Oe. Moreover, the average tape thickness was 5.2 μm. A magnetic recording medium as Example 12 was obtained in a similar manner to Example 1 described above except for the points described above. Note that the obtained magnetic recording medium had a magnetic layer Ra of 1.8 nm, a magnetic layer PSD of 1.9 μm, and a half-value width PW50 of an isolated waveform of 166 nm in a reproduced waveform.

Example 13

The media configuration was set to 5 (Table 2). In the step of preparing the magnetic layer forming coating material, barium ferrite ($BaFe_{12}O_{19}$) particles in the first composition had a powder average aspect ratio of 2.3, an average particle size of 17 nm, and an average particle volume of 1400 $nm^3$. Furthermore, in the application step, the magnetic layer had an average thickness of 60 nm, the coercive force Hc1 was 2550 Oe, and the coercive force Hc2 was 1820 Oe. Moreover, the average tape thickness was 4.5 μm. A magnetic recording medium as Example 13 was obtained in a similar manner to Example 1 described above except for the points described above. Note that the obtained magnetic recording medium had a magnetic layer Ra of 1.8 nm, a magnetic layer PSD of 1.9 μm, and a half-value width PW50 of an isolated waveform of 166 nm in a reproduced waveform.

Example 14

The media configuration was set to 6 (Table 2). In the step of preparing the magnetic layer forming coating material, barium ferrite ($BaFe_{12}O_{19}$) particles in the first composition had a powder average aspect ratio of 2.0, an average particle size of 15 nm, and an average particle volume of 1100 $nm^3$. Furthermore, in the application step, the magnetic layer had an average thickness of 60 nm, the coercive force Hc1 was 2500 Oe, and the coercive force Hc2 was 1840 Oe. Moreover, the average tape thickness was 4.5 μm. A magnetic recording medium as Example 14 was obtained in a similar manner to Example 1 described above except for the points described above. Note that the obtained magnetic recording medium had a magnetic layer Ra of 1.75 nm, a magnetic layer PSD of 1.8 μm, and a half-value width PW50 of an isolated waveform of 155 nm in a reproduced waveform.

Example 15

In the application step, the magnetic layer had an average thickness of 90 nm, the coercive force Hc1 was 2990 Oe, and the coercive force Hc2 was 1500 Oe. A magnetic recording medium as Example 15 was obtained in a similar manner to Example 1 described above except for the points described above. Note that the obtained magnetic recording medium had a magnetic layer Ra of 1.85 nm, a magnetic layer PSD of 2.0 μm, and a half-value width PW50 of an isolated waveform of 175 nm in a reproduced waveform.

Example 16

In the application step, the coercive force Hc1 was 2690 Oe, and the coercive force Hc2 was 2150 Oe. A magnetic recording medium as Example 16 was obtained in a similar manner to Example 1 described above except for the points described above. Note that the obtained magnetic recording medium had a magnetic layer Ra of 1.85 nm, a magnetic layer PSD of 2.0 µm, and a half-value width PW50 of an isolated waveform of 180 nm in a reproduced waveform.

Example 17

In the step of preparing the magnetic layer forming coating material, powder of ε iron oxide particles (spherical shape, average aspect ratio 1.3, average particle size 15.7 nm, particle volume 2050 nm$^3$) was used as the magnetic powder. Furthermore, in the application step, the magnetic layer had an average thickness of 90 nm, the coercive force Hc1 was 2900 Oe, and the coercive force Hc2 was 1950 Oe. A magnetic recording medium as Example 17 was obtained in a similar manner to Example 1 described above except for the points described above. Note that the obtained magnetic recording medium had a magnetic layer Ra of 2 nm, a magnetic layer PSD of 2.1 µm, and a half-value width PW50 of an isolated waveform of 175 nm in a reproduced waveform.

Example 18

By changing the calendering conditions, the obtained magnetic recording medium had a magnetic layer Ra of 1.6 nm and a magnetic layer PSD of 1.7 µm. Note that the obtained magnetic recording medium had a half-value width PW50 of an isolated waveform of 175 nm in a reproduced waveform.

Example 19

By changing the calendering conditions, the obtained magnetic recording medium had a magnetic layer Ra of 2.4 nm and a magnetic layer PSD of 2.5 µm. Note that the obtained magnetic recording medium had a half-value width PW50 of an isolated waveform of 175 nm in a reproduced waveform.

Comparative Example 1

In the step of preparing the magnetic layer forming coating material, barium ferrite ($BaFe_{12}O_{19}$) particles in the first composition had a powder average aspect ratio of 3.5, an average particle size of 23.6 nm, and an average particle volume of 2450 nm$^3$. Furthermore, in the application step, the magnetic layer had an average thickness of 85 nm, and the coercive force Hc1 was 2820 Oe. A magnetic recording medium as Comparative Example 1 was obtained in a similar manner to Example 1 described above except for the points described above. Note that the obtained magnetic recording medium had a magnetic layer Ra of 1.9 nm, a magnetic layer PSD of 2.1 µm, and a half-value width PW50 of an isolated waveform of 205 nm in a reproduced waveform.

Comparative Example 2

In the application step, the magnetic layer had an average thickness of 100 nm. A magnetic recording medium as Comparative Example 2 was obtained in a similar manner to Example 1 described above except for the points described above. Note that the obtained magnetic recording medium had a magnetic layer Ra of 1.9 nm, a magnetic layer PSD of 2.1 µm, and a half-value width PW50 of an isolated waveform of 202 nm in a reproduced waveform.

Comparative Example 3

In the application step, the magnetic layer had an average thickness of 85 nm, the coercive force Hc1 was 2500 Oe, and the coercive force Hc2 was 2100 Oe. A magnetic recording medium as Comparative Example 3 was obtained in a similar manner to Example 1 described above except for the points described above. Note that the obtained magnetic recording medium had a magnetic layer Ra of 1.9 nm, a magnetic layer PSD of 2.1 µm, and a half-value width PW50 of an isolated waveform of 180 nm in a reproduced waveform.

Comparative Example 4

In the step of preparing the magnetic layer forming coating material, barium ferrite ($BaFe_{12}O_{19}$) particles in the first composition had a powder average aspect ratio of 3.0, an average particle size of 21.3 nm, and an average particle volume of 2090 nm$^3$. Furthermore, in the application step, the coercive force Hc1 was 3100 Oe. A magnetic recording medium as Comparative Example 4 was obtained in a similar manner to Example 1 described above except for the points described above. Note that the obtained magnetic recording medium had a magnetic layer Ra of 1.9 nm, a magnetic layer PSD of 2.1 µm, and a half-value width PW50 of an isolated waveform of 190 nm in a reproduced waveform.

Comparative Example 5

In the step of preparing the magnetic layer forming coating material, powder of ε iron oxide particles (spherical shape, average aspect ratio 1.3, average particle size 15.7 nm, particle volume 2050 nm$^3$) was used as the magnetic powder. Furthermore, in the application step, the coercive force Hc1 was 2550 Oe, and the coercive force Hc2 was 2080 Oe. A magnetic recording medium as Comparative Example 5 was obtained in a similar manner to Example 1 described above except for the points described above. Note that the obtained magnetic recording medium had a magnetic layer Ra of 1.9 nm, a magnetic layer PSD of 2.1 µm, and a half-value width PW50 of an isolated waveform of 180 nm in a reproduced waveform.

Comparative Example 6

In the step of preparing the magnetic layer forming coating material, cobalt ferrite powder (cubic shape, average aspect ratio 1.1, average particle size 12.6 nm, particle volume 2030 nm$^3$) was used as the magnetic powder. Furthermore, in the application step, the coercive force Hc1 was 2450 Oe, and the coercive force Hc2 was 2080 Oe. A magnetic recording medium as Comparative Example 6 was obtained in a similar manner to Example 1 described above except for the points described above. Note that the obtained magnetic recording medium had a magnetic layer Ra of 1.9 nm, a magnetic layer PSD of 2.1 µm, and a half-value width PW50 of an isolated waveform of 179 nm in a reproduced waveform.

Comparative Example 7

By adjusting the additive of the magnetic layer, the obtained magnetic recording medium had a magnetic layer Ra of 2.55 nm and a magnetic layer PSD of 3.2 µm. Note that the obtained magnetic recording medium had a half-value width PW50 of an isolated waveform of 205 nm in a reproduced waveform.

Comparative Example 8

By adjusting the additive of the magnetic layer, the obtained magnetic recording medium had a magnetic layer Ra of 1.66 nm and a magnetic layer PSD of 1.7 µm. Note that the obtained magnetic recording medium had a half-value width PW50 of an isolated waveform of 173 nm in a reproduced waveform.

[Evaluation]

The magnetic recording media of Examples 1 to 19 and Comparative Examples 1 to 8 obtained in such a manner as described above were evaluated as follows.

(C/N)

First, a reproduction signal of a magnetic recording medium was acquired using a loop tester (manufactured by Microphysics, Inc.). Acquisition conditions of the reproduction signal are described below.

Head: GMR head
Speed: 2 m/s
Reproduction signal: single recording frequency (10 MHz)
Recording current: optimum recording current Next, the reproduction signal was captured by a spectrum analyze. An average value of reproduction output values at 10 MHz and an average value of noise at 10 MHz±1 MHz were measured, and a difference therebetween was defined as C/N. The results are indicated in Table 1 as relative values with C/N of Comparative Example 1 as 0 dB. Note that if C/N is 1.5 dB or more, a medium that can withstand a short wavelength and a narrow track density can be achieved.

TABLE 1

| | | Magnetic powder | | | | | | Tape | |
| --- | --- | --- | --- | --- | --- | --- | --- | --- | --- |
| | | | | | | | | Average | |
| | No. | Composition | Particle shape | Average aspect ratio | Average particle size [nm] | Particle volume [nm³] | Media configuration | thickness of base layer [µm] | Average thickness of tape [µm] |
| Example 1 | 1A | $BaFe_{12}O_{19}$ | plate shape | 2.8 | 20.3 | 1950 | 1 | 1.1 | 5.6 |
| Example 2 | 2A | $BaFe_{12}O_{19}$ | plate shape | 2.6 | 18.6 | 1600 | 1 | 1.1 | 5.6 |
| Example 3 | 3A | $BaFe_{12}O_{19}$ | plate shape | 3 | 21.3 | 2100 | 1 | 1.1 | 5.6 |
| Example 4 | 1A | $BaFe_{12}O_{19}$ | plate shape | 2.8 | 20.3 | 1950 | 1 | 1.1 | 5.6 |
| Example 5 | 4A | $BaFe_{12}O_{19}$ | plate shape | 2.9 | 20.9 | 2050 | 1 | 1.1 | 5.6 |
| Example 6 | 7A | $\varepsilon\text{-}Fe_2O_3$ | spherical shape | 1.3 | 15.7 | 2050 | 1 | 1.1 | 5.6 |
| Example 7 | 8A | $CoO(Fe_2O_3)$ | cubic shape | 1.1 | 12.6 | 2030 | 1 | 1.1 | 5.6 |
| Example 8 | 5A | $BaFe_{12}O_{19}$ | plate shape | 2.3 | 17 | 1400 | 1 | 1.1 | 5.6 |
| Example 9 | 6A | $BaFe_{12}O_{19}$ | plate shape | 2 | 15 | 1100 | 1 | 1.1 | 5.6 |
| Example 10 | 1A | $BaFe_{12}O_{19}$ | plate shape | 2.8 | 20.3 | 1950 | 2 | 1.1 | 5.6 |
| Example 11 | 2A | $BaFe_{12}O_{19}$ | plate shape | 2.6 | 18.6 | 1600 | 3 | 1.1 | 5.2 |
| Example 12 | 5A | $BaFe_{12}O_{19}$ | plate shape | 2.3 | 17 | 1400 | 4 | 1.1 | 5.2 |
| Example 13 | 5A | $BaFe_{12}O_{19}$ | plate shape | 2.3 | 17 | 1400 | 5 | 1.0 | 4.5 |
| Example 14 | 6A | $BaFe_{12}O_{19}$ | plate shape | 2 | 15 | 1100 | 6 | 1.0 | 4.5 |
| Example 15 | 1A | $BaFe_{12}O_{19}$ | plate shape | 2.8 | 20.3 | 1950 | 1 | 1.1 | 5.6 |
| Example 16 | 1A | $BaFe_{12}O_{19}$ | plate shape | 2.8 | 20.3 | 1950 | 1 | 1.1 | 5.6 |
| Example 17 | 7A | $\varepsilon\text{-}Fe_2O_3$ | spherical shape | 1.3 | 15.7 | 2050 | 1 | 1.1 | 5.6 |
| Example 18 | 1A | $BaFe_{12}O_{19}$ | plate shape | 2.8 | 20.3 | 1950 | 1 | 1.1 | 5.6 |
| Example 19 | 1A | $BaFe_{12}O_{19}$ | plate shape | 2.8 | 20.3 | 1950 | 1 | 1.1 | 5.6 |
| Comparative Example 1 | 2B | $BaFe_{12}O_{19}$ | plate shape | 3.5 | 23.6 | 2450 | 1 | 1.1 | 5.6 |
| Comparative Example 2 | 1A | $BaFe_{12}O_{19}$ | plate shape | 2.8 | 20.3 | 1950 | 1 | 1.1 | 5.6 |

TABLE 1-continued

| | | | | | | | | | |
|---|---|---|---|---|---|---|---|---|---|
| Comparative Example 3 | 1A | $BaFe_{12}O_{19}$ | plate shape | 2.8 | 20.3 | 1950 | 1 | 1.1 | 5.6 |
| Comparative Example 4 | 9A | $BaFe_{12}O_{19}$ | plate shape | 3.0 | 21.3 | 2090 | 1 | 1.1 | 5.6 |
| Comparative Example 5 | 7A | $\varepsilon\text{-}Fe_2O_3$ | spherical shape | 1.3 | 15.7 | 2050 | 1 | 1.1 | 5.6 |
| Comparative Example 6 | 8A | $CoO(Fe_2O_3)$ | cubic shape | 1.1 | 12.6 | 2030 | 1 | 1.1 | 5.6 |
| Comparative Example 7 | 1A | $BaFe_{12}O_{19}$ | plate shape | 2.8 | 20.3 | 1950 | 1 | 1.1 | 5.6 |
| Comparative Example 8 | 1A | $BaFe_{12}O_{19}$ | plate shape | 2.8 | 20.3 | 1950 | 1 | 1.1 | 5.6 |

| | Tape | | | | | | | |
|---|---|---|---|---|---|---|---|---|
| | Average thickness of magnetic layer [μm] | Hc1 [Oe] | Hc2 [Oe] | Hc2/ Hc1 | Magnetic layer Ra [nm] | Magnetic layer PSD (≤5 μm) [μm] | PW50 [nm] | Evaluation result C/N [dB] |
| Example 1 | 80 | 2750 | 2000 | 0.73 | 1.9 | 2.1 | 175 | 2.0 |
| Example 2 | 60 | 2920 | 1920 | 0.66 | 1.85 | 2 | 170 | 3.8 |
| Example 3 | 80 | 2750 | 2000 | 0.73 | 1.9 | 2.1 | 177 | 1.7 |
| Example 4 | 90 | 2750 | 2000 | 0.73 | 1.9 | 2.1 | 175 | 1.6 |
| Example 5 | 80 | 2980 | 2000 | 0.67 | 1.9 | 2.1 | 177 | 2.6 |
| Example 6 | 80 | 2850 | 2020 | 0.71 | 2 | 2.1 | 177 | 2.1 |
| Example 7 | 80 | 2800 | 2020 | 0.72 | 2 | 2.1 | 177 | 1.9 |
| Example 8 | 60 | 2550 | 1820 | 0.71 | 1.8 | 1.9 | 170 | 3 |
| Example 9 | 60 | 2500 | 1840 | 0.74 | 1.75 | 1.8 | 160 | 3.3 |
| Example 10 | 80 | 2750 | 2000 | 0.73 | 1.9 | 2.1 | 175 | 1.6 |
| Example 11 | 60 | 2920 | 1920 | 0.66 | 1.85 | 2 | 168 | 3.3 |
| Example 12 | 60 | 2550 | 1820 | 0.71 | 1.8 | 1.9 | 166 | 2.5 |
| Example 13 | 60 | 2550 | 1820 | 0.71 | 1.8 | 1.9 | 166 | 2 |
| Example 14 | 60 | 2500 | 1840 | 0.74 | 1.75 | 1.8 | 155 | 2.3 |
| Example 15 | 90 | 2990 | 1500 | 0.5 | 1.85 | 2 | 175 | 3 |
| Example 16 | 80 | 2690 | 2150 | 0.8 | 1.85 | 2 | 180 | 1.3 |
| Example 17 | 90 | 2900 | 1950 | 0.67 | 2 | 2.1 | 175 | 2.5 |
| Example 18 | 80 | 2750 | 2000 | 0.73 | 1.6 | 1.7 | 175 | 3 |
| Example 19 | 80 | 2750 | 2000 | 0.73 | 2.4 | 2.5 | 175 | 1.2 |
| Comparative Example 1 | 85 | 2820 | 2000 | 0.71 | 1.9 | 2.1 | 205 | 0 |
| Comparative Example 2 | 100 | 2750 | 2000 | 0.73 | 1.9 | 2.1 | 202 | 1 |
| Comparative Example 3 | 85 | 2500 | 2100 | 0.84 | 1.9 | 2.1 | 180 | 0.3 |
| Comparative Example 4 | 80 | 3100 | 2000 | 0.65 | 1.9 | 2.1 | 190 | 0.9 |
| Comparative Example 5 | 80 | 2550 | 2080 | 0.82 | 1.9 | 2.1 | 180 | 0.7 |
| Comparative Example 6 | 80 | 2450 | 2080 | 0.85 | 1.9 | 2.1 | 179 | 0.6 |
| Comparative Example 7 | 80 | 2750 | 2000 | 0.73 | 2.55 | 3.2 | 205 | 0.2 |
| Comparative Example 8 | 80 | 2750 | 2000 | 0.73 | 1.6 | 1.7 | 173 | 2.6 |

Table 1 indicates magnetic characteristics and evaluation results of magnetic recording media of Examples 1 to 19 and Comparative Examples 1 to 8.

TABLE 2

| | Tape configuration | Average thickness of magnetic tape [μm] | Number of servo tracks | Average thickness of base film [μm] | W/L | W [μm] | L [μm] |
|---|---|---|---|---|---|---|---|
| Media configuration 1 | magnetic layer/base layer/base film/back layer | 5.6 | 5 | 4.0 | 50 | 2.9 | 0.052 |
| Media configuration 2 | magnetic layer/base layer/base film/back layer | 5.6 | 5 | 4.0 | 30 | 1.5 | 0.048 |
| Media configuration 3 | magnetic layer/base layer/base film/back layer | 5.2 | 5 | 3.6 | 23 | 0.95 | 0.042 |
| Media configuration 4 | magnetic layer/base layer/base film/back layer | 5.2 | 9 | 3.6 | 13 | 0.51 | 0.039 |

TABLE 2-continued

| | Tape configuration | Average thickness of magnetic tape [μm] | Number of servo tracks | Average thickness of base film [μm] | W/L | W [μm] | L [μm] |
|---|---|---|---|---|---|---|---|
| Media configuration 5 | magnetic layer/base layer/base film/back layer | 4.5 | 9 | 3.1 | 21 | 0.83 | 0.039 |
| Media configuration 6 | magnetic layer/base layer/base film/back layer | 4.5 | 9 | 3.1 | 16 | 0.63 | 0.038 |

Table 2 indicates media configurations adopted in the magnetic recording media of Examples 1 to 19 and Comparative Examples 1 to 8.

As indicated in Tables 1 and 2, in Examples 1 to 19, an arithmetic average roughness Ra of a surface of the magnetic layer is 2.5 nm or less, PSD to a spatial wavelength 5 μm is 2.5 μm or less, an average thickness of the magnetic layer is 90 nm or less, an average aspect ratio of the magnetic powder is 1.0 or more and 3.0 or less, a coercive force Hc1 in the perpendicular direction is 3000 Oe or less, Hc2/Hc1 is 0.8 or less, and a half-value width PW50 of an isolated waveform in a reproduced waveform of a data signal is 200 nm or less. Therefore, it is possible to secure good electromagnetic conversion characteristics (C/N) while making a magnetization transition width steep. Therefore, a configuration advantageous for high-density recording can be implemented.

Furthermore, in Examples 1, 2, 4, 8 to 15, and 17 to 19, the half-value width PW50 was 175 nm or less, and therefore excellent electromagnetic conversion characteristics (C/N) were obtained.

In particular, in Examples 2, 8, 9, and 11 to 14, the half-value width PW50 was 170 nm or less, and therefore better electromagnetic conversion characteristics (C/N) were obtained.

In Comparative Example 1, the average aspect ratio of the magnetic powder exceeded 3.0, and therefore stacking of the magnetic tape occurred, and the electromagnetic conversion characteristics deteriorated.

In Comparative Example 2, the average thickness of the magnetic layer was large, and the electromagnetic conversion characteristics at a short wavelength deteriorated.

In Comparative Example 3, the degree of perpendicular orientation was low, and the electromagnetic conversion characteristics deteriorated.

In Comparative Example 4, the coercive force Hc1 in the perpendicular direction was too large, and therefore an unsaturated region was generated, and the electromagnetic conversion characteristics deteriorated.

In Comparative Examples 5 and 6, the degree of perpendicular orientation was low, and the electromagnetic conversion characteristics deteriorated.

In Comparative Example 7, the surface roughness Ra of the magnetic layer was too large, and the electromagnetic conversion characteristics deteriorated.

Furthermore, due to the deterioration of the surface property, a gap was generated between the surface of the magnetic layer and the magnetic head, and the half-value width PW50 also deteriorated.

In Comparative Example 8, although the electromagnetic conversion characteristics were improved, the magnetic recording medium could not travel due to an increase in frictional force on the surface of the magnetic layer.

Although the present disclosure has been specifically described with reference to the embodiment and Modifications thereof, the present disclosure is not limited to the above-described embodiment and the like, and various modifications can be made.

For example, the configurations, the methods, the steps, the shapes, the materials, the numerical values, and the like exemplified in the embodiment described above and Modifications thereof are only examples, and a configuration, a method, a step, a shape, a material, a numerical value, and the like different therefrom may be used as necessary. Specifically, the magnetic recording medium of the present disclosure may include components other than the substrate, the base layer, the magnetic layer, the back layer, and the barrier layer. Furthermore, the chemical formulae of the compounds and the like are representative and are not limited to the described valences and the like as long as the compounds have common names of the same compound.

Furthermore, the configurations, the methods, the steps, the shapes, the materials, the numerical values, and the like in the embodiment described above and Modifications thereof can be combined to each other as long as not departing from the gist of the present disclosure.

Furthermore, within the numerical range described step by step here, an upper limit value or a lower limit value of a numerical range in one stage may be replaced with an upper limit value or a lower limit value of a numerical range in another stage. The materials exemplified here can be used singly or in combination of two or more thereof unless otherwise specified.

As described above, the magnetic recording medium according to an embodiment of the present disclosure can implement higher-density recording.

Note that the effect of the present disclosure is not limited thereto, and may be any effect described here. Furthermore, the present technology can take the following configurations.

(1)

A tape-shaped magnetic recording medium including:
- a substrate containing a polyester as a main component; and
- a magnetic layer disposed on the substrate, including a plurality of types of magnetic powder, and capable of recording a data signal, in which
- a surface of the magnetic layer has an arithmetic average roughness Ra of 2.5 nm or less,
- a power spectrum density (PSD) up to a spatial wavelength of 5 μm is 2.5 μm or less,
- the magnetic layer has an average thickness of 90 nm or less,
- the magnetic powder has an average aspect ratio of 1.0 or more and 3.0 or less,
- a coercive force in a perpendicular direction is 3000 oersted or less,
- a ratio of a coercive force in a longitudinal direction to the coercive force in the perpendicular direction is 0.8 or less, and a half-value width of an isolated waveform in a reproduced waveform of the data signal is 200 nm or less.

(2)

The magnetic recording medium according to (1) described above, in which the half-value width of an isolated waveform in a reproduced waveform of the data signal is 175 nm or less.

(3)

The magnetic recording medium according to (1) described above, in which the half-value width of an isolated waveform in a reproduced waveform of the data signal is 170 nm or less.

(4)

The magnetic recording medium according to (1) described above, in which the half-value width of an isolated waveform in a reproduced waveform of the data signal is 165 nm or less.

(5)

The magnetic recording medium according to any one of (1) to (4) described above, in which the plurality of types of magnetic powder has an average particle size of 8 nm or more and 22 nm or less.

(6)

The magnetic recording medium according to any one of (1) to (5) described above, in which the plurality of types of magnetic powder has an average particle volume of 2300 nm$^3$ or less.

(7)

The magnetic recording medium according to any one of (1) to (6) described above, in which the magnetic layer has a plurality of servo bands capable of recording a plurality of servo signals, respectively, and a ratio of the total area of the plurality of servo bands to the area of a surface of the magnetic layer is 4.0% or less.

(8)

The magnetic recording medium according to any one of (1) to (7) described above, in which the number of the plurality of servo bands is 5 or more.

(9)

The magnetic recording medium according to any one of (1) to (8) described above, in which the servo band has a width of 95 nm or less.

(10)

The magnetic recording medium according to any one of (1) to (9) described above, in which the magnetic layer can form a plurality of recording tracks, and the recording track has a width of 3.0 µm or less.

(11)

The magnetic recording medium according to any one of (1) to (10) described above, in which the magnetic layer can record data such that a minimum value of a distance between magnetization inversions is 48 nm or less.

(12)

The magnetic recording medium according to any one of (1) to (11) described above, in which the coercive force in the longitudinal direction is 2000 Oe or less.

(13)

The magnetic recording medium according to any one of (1) to (12) described above, having an average thickness of 5.6 µm or less.

(14)

The magnetic recording medium according to any one of (1) to (13) described above, in which the substrate has an average thickness of 4.2 µm or less.

(15)

The magnetic recording medium according to any one of (1) to (14) described above, in which the magnetic powder includes hexagonal ferrite including at least one of barium (Ba) and strontium (Sr), ε iron oxide including at least one of aluminum (Al) and gallium (Ga), or cobalt (Co)-containing spinel type ferrite.

(16)

The magnetic recording medium according to any one of (1) to (15) described above, in which the magnetic layer has an average thickness of 80 nm or less.

(17)

The magnetic recording medium according to any one of (1) to (16) described above, in which the magnetic layer has an average thickness of 70 nm or less.

(18)

The magnetic recording medium according to any one of (1) to (17) described above, in which when the coercive force in the perpendicular direction is represented by Hc1 and the coercive force in the longitudinal direction is represented by Hc2, the following conditional formula <1> is satisfied:

$$Hc2/Hc1 \leq 0.7 \qquad <1>.$$

(19)

The magnetic recording medium according to any one of (1) to (18) described above, in which the coercive force in the perpendicular direction is 2900 Oe or more.

(20)

A magnetic recording/reproducing device including:

a feeding unit that can sequentially feed out a tape-shaped magnetic recording medium;

a winding unit that can wind up the magnetic recording medium fed out from the feeding unit; and a magnetic head that can write information in the magnetic recording medium and can read out information from the magnetic recording medium while being in contact with the magnetic recording medium traveling from the feeding unit toward the winding unit, in which the magnetic recording medium includes:

a substrate containing a polyester as a main component; and a magnetic layer disposed on the substrate, including a plurality of types of magnetic powder, and capable of recording a data signal, a surface of the magnetic layer has an arithmetic average roughness Ra of 2.5 nm or less, a power spectrum density (PSD) up to a spatial wavelength of 5 µm is 2.5 µm or less, the magnetic layer has an average thickness of 90 nm or less, the magnetic powder has an average aspect ratio of 1.0 or more and 3.0 or less, a coercive force in a perpendicular direction is 3000 oersted or less, a ratio of a coercive force in a longitudinal direction to the coercive force in the perpendicular direction is 0.8 or less, and a half-value width of an isolated waveform in a reproduced waveform of the data signal is 200 nm or less.

(21) A magnetic recording medium cartridge including:

a tape-shaped magnetic recording medium; and a casing that houses the magnetic recording medium, in which the magnetic recording medium includes:

a substrate containing a polyester as a main component; and a magnetic layer disposed on the substrate, including a plurality of types of magnetic powder, and capable of recording a data signal, a surface of the magnetic layer has an arithmetic average roughness Ra of 2.5 nm or less, a power spectrum density (PSD) up to a spatial wavelength of 5 µm is 2.5 µm or less, the magnetic layer has an average thickness of 90 nm or less, the magnetic powder has an average aspect ratio of 1.0 or more and 3.0 or less, a coercive force in a perpendicular direction is 3000 oersted or less, a ratio of a coercive force in a longitudinal direction to the coercive force in the perpendicular direction is 0.8 or less, and a half-value width of an isolated waveform in a reproduced waveform of the data signal is 200 nm or less.

This application claims the benefit of priority based on Japanese Patent Application No. 2019-181511 filed on Oct. 1, 2019, the entire contents of which are incorporated herein by reference.

A person skilled in the art can conceive of various modifications, combinations, sub-combinations, and changes, in accordance with design requirements and other factors. It is understood that these modifications, combinations, sub-combinations, and changes are included in the appended claims and the scope of equivalents thereof.

The invention claimed is:

1. A magnetic recording medium comprising:

a substrate containing a polyester as a main component; and a magnetic layer disposed on the substrate, including a plurality of types of magnetic powder, and capable of recording a data signal in which a half-value width of an isolated waveform in a reproduced waveform of the data signal is 200 nm or less, wherein a surface of the magnetic layer has an arithmetic average roughness Ra of 2.5 nm or less, a power spectrum density (PSD) up to a spatial wavelength of 5 µm is 2.5 µm or less, the magnetic layer has an average thickness of 90 nm or less, the plurality of types of magnetic powder have an average aspect ratio of 1.0 or more and 3.0 or less, a coercive force in a perpendicular direction is 3000 oersted or less, and a ratio of a coercive force in a longitudinal direction to the coercive force in the perpendicular direction is 0.8 or less, wherein the magnetic recording medium is tape-shaped.

2. The magnetic recording medium according to claim 1, wherein the half-value width of an isolated waveform in a reproduced waveform of the data signal is 175 nm or less.

3. The magnetic recording medium according to claim 1, wherein the half-value width of an isolated waveform in a reproduced waveform of the data signal is 170 nm or less.

4. The magnetic recording medium according to claim 1, wherein the half-value width of an isolated waveform in a reproduced waveform of the data signal is 165 nm or less.

5. The magnetic recording medium according to claim 1, wherein the plurality of types of magnetic powder have an average particle size of 8 nm or more and 22 nm or less.

6. The magnetic recording medium according to claim 1, wherein the plurality of types of magnetic powder have an average particle volume of 2300 $nm^3$ or less.

7. The magnetic recording medium according to claim 1, wherein the magnetic layer has a plurality of servo bands capable of recording a plurality of servo signals, respectively, and a ratio of a total area of the plurality of servo bands to an area of a surface of the magnetic layer is 4.0% or less.

8. The magnetic recording medium according to claim 7, wherein the number of the plurality of servo bands is 5 or more.

9. The magnetic recording medium according to claim 7, wherein each of the plurality of servo bands has a width of 95 nm or less.

10. The magnetic recording medium according to claim 1, wherein the magnetic layer can form a plurality of recording tracks, and each of the plurality of recording tracks has a width of 3.0 µm or less.

11. The magnetic recording medium according to claim 1, wherein the magnetic layer can record data such that a minimum value of a distance between magnetization inversions is 48 nm or less.

12. The magnetic recording medium according to claim 1, wherein the coercive force in the longitudinal direction is 2000 Oe or less.

13. The magnetic recording medium according to claim 1, having an average thickness of 5.6 µm or less.

14. The magnetic recording medium according to claim 1, wherein the substrate has an average thickness of 4.2 µm or less.

15. The magnetic recording medium according to claim 1, wherein the plurality of types of magnetic powder include hexagonal ferrite including at least one of barium (Ba) and strontium (Sr), ε iron oxide including at least one of aluminum (Al) and gallium (Ga), or cobalt (Co)-containing spinel type ferrite.

16. The magnetic recording medium according to claim 1, wherein the magnetic layer has an average thickness of 80 nm or less.

17. The magnetic recording medium according to claim 1, wherein the magnetic layer has an average thickness of 70 nm or less.

18. The magnetic recording medium according to claim 1, wherein when the coercive force in the perpendicular direction is represented by Hc1 and the coercive force in the longitudinal direction is represented by Hc2, the following conditional formula (1) is satisfied:

$$Hc2/Hc1 \leq 0.7 \qquad (1).$$

19. The magnetic recording medium according to claim 1, wherein the coercive force in the perpendicular direction is 2900 Oe or more.

20. A magnetic recording/reproducing device comprising:

a magnetic recording medium;

a feeding unit that can sequentially feed out the magnetic recording medium;

a winding unit that can wind up the magnetic recording medium fed out from the feeding unit; and a magnetic head that can write information on the magnetic recording medium and can read out information from the magnetic recording medium while being in contact with the magnetic recording medium traveling from the feeding unit toward the winding unit, wherein the magnetic recording medium includes:

a substrate containing a polyester as a main component; and a magnetic layer disposed on the substrate, including a plurality of types of magnetic powder, and capable of recording a data signal in which a half-value width of an isolated waveform in a reproduced waveform of the data signal is 200 nm or less, a surface of the magnetic layer has an arithmetic average roughness Ra of 2.5 nm or less, a power spectrum density (PSD) up to a spatial wavelength of 5 μm is 2.5 μm or less, the magnetic layer has an average thickness of 90 nm or less, the plurality of types of magnetic powder have an average aspect ratio of 1.0 or more and 3.0 or less, a coercive force in a perpendicular direction is 3000 oersted or less, and a ratio of a coercive force in a longitudinal direction to the coercive force in the perpendicular direction is 0.8 or less, wherein the magnetic recording medium is tape-shaped.

21. A magnetic recording medium cartridge comprising:

a magnetic recording medium; and a casing that houses the magnetic recording medium, wherein the magnetic recording medium includes:

a substrate containing a polyester as a main component; and a magnetic layer disposed on the substrate, including a plurality of types of magnetic powder, and capable of recording a data signal in which a half-value width of an isolated waveform in a reproduced waveform of the data signal is 200 nm or less, a surface of the magnetic layer has an arithmetic average roughness Ra of 2.5 nm or less, a power spectrum density (PSD) up to a spatial wavelength of 5 μm is 2.5 μm or less, the magnetic layer has an average thickness of 90 nm or less, the plurality of types of magnetic powder have an average aspect ratio of 1.0 or more and 3.0 or less, a coercive force in a perpendicular direction is 3000 oersted or less, and a ratio of a coercive force in a longitudinal direction to the coercive force in the perpendicular direction is 0.8 or less, wherein the magnetic recording medium is tape-shaped.

\* \* \* \* \*